United States Patent
Matsushita et al.

(10) Patent No.: US 7,912,692 B2
(45) Date of Patent: Mar. 22, 2011

(54) ANALYSIS SUPPORT SYSTEM AND METHOD, COMPUTER READABLE RECORDING MEDIUM STORING ANALYSIS SUPPORT PROGRAM, AND ANALYSIS SUPPORT APPARATUS

(75) Inventors: Hideharu Matsushita, Kawasaki (JP); Akira Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 11/961,046

(22) Filed: Dec. 20, 2007

(65) Prior Publication Data
US 2008/0201120 A1 Aug. 21, 2008

(30) Foreign Application Priority Data

Feb. 20, 2007 (JP) ................. 2007-039761

(51) Int. Cl.
G06F 17/50 (2006.01)
G06G 7/62 (2006.01)
(52) U.S. Cl. ......................... 703/13; 716/106
(58) Field of Classification Search ...... 703/13
See application file for complete search history.

(56) References Cited

U.S. PATENT DOCUMENTS

| | | | | |
|---|---|---|---|---|
| 5,544,067 A * | 8/1996 | Rostoker et al. | ................ | 703/14 |
| 6,608,623 B1 * | 8/2003 | Gerlovin et al. | ............. | 345/419 |
| 6,678,877 B1 * | 1/2004 | Perry et al. | ...................... | 716/15 |
| 7,111,275 B2 * | 9/2006 | Chen et al. | ...................... | 716/18 |
| 7,124,380 B2 * | 10/2006 | Keller et al. | ...................... | 716/4 |
| 7,505,884 B2 * | 3/2009 | Dadkhah et al. | ................... | 703/2 |
| 7,558,639 B2 * | 7/2009 | Rassaian et al. | ................ | 700/98 |
| 7,574,342 B2 * | 8/2009 | Kundert | ........................... | 703/13 |
| 7,587,692 B2 * | 9/2009 | Chandra | ........................... | 716/4 |

FOREIGN PATENT DOCUMENTS

| | | |
|---|---|---|
| JP | 7-287727 | 10/1995 |
| JP | 9-138812 | 5/1997 |
| JP | 9-245072 | 9/1997 |
| JP | 10-187771 | 7/1998 |
| JP | 2003-30258 | 1/2003 |
| JP | 2006-4259 | 1/2006 |

* cited by examiner

Primary Examiner — Mary C Jacob
(74) Attorney, Agent, or Firm — Fujitsu Patent Center

(57) ABSTRACT

An analysis support system has an analysis purpose input section being able to input an analysis purpose, an analysis level designator designating an analysis level representing a range for analysis according to the inputted analysis purpose, a configuration information record section recording configuration information about other component to be combined with each component, in association with the analysis level, a purpose-specific component group generator generating a purpose-specific component group representing an analytic component that is to configure the purpose-specific analytic model on the basis of the analysis level and the configuration information, and an analytic model generator generating the purpose-specific analytic model on the basis of a basic analytic model having the analytic component corresponding to the analysis object and the purpose-specific component group. An analytic model according to an analysis purpose can be readily generated, which improves the serviceability.

20 Claims, 25 Drawing Sheets

FIG. 20

| NO | ANALYSIS LEVEL | THE NUMBER OF MESHES | EXECUTION PERIOD | EXECUTION CPU | THE NUMBER OF UNITS | THE NUMBER OF PCBS | THE NUMBER OF ICS | OTHERS |
|---|---|---|---|---|---|---|---|---|
| 1 | UNIT ZOOM | 2 MIL. | 8H | 3.2Ghz | 4 | 20 | 0 | |
| 2 | UNIT ZOOM | 5 MIL. | 20H | 3.2Ghz | 4 | 20 | 0 | |
| 3 | PCB ZOOM | 1 MIL. | 4H | 3.2Ghz | 0 | 2 | 200 | |
| 4 | PCB ZOOM | 0.01 MIL. | 10M | 3.2Ghz | 0 | 2 | 200 | |
| 5 | LSI ZOOM | 1.5 MIL. | 8H | 2.4Ghz | 0 | 0 | 1 | 20 |
| 6 | LSI ZOOM | 1 MIL. | 4H | 2.4Ghz | 0 | 0 | 1 | 20 |

64

ANALYSIS SUPPORT SYSTEM AND METHOD, COMPUTER READABLE RECORDING MEDIUM STORING ANALYSIS SUPPORT PROGRAM, AND ANALYSIS SUPPORT APPARATUS

BACKGROUND OF THE INVENTION

1. Field of the Invention

The present invention relates to a technique for generating an analytic model having analytic components generated on the basis of a plurality of components configuring an analysis object. For example, the present invention relates to a technique suitable for use to generate a purpose-specific analytic model suited to a purpose of analysis which does not depend on a shape of a component such as thermal analysis or the like.

2. Description of the Related Art

Use of design supporting tools such as CAD (Computer Aided Design), EDA (Electronic Design Automation) and the like is general in designing electronic devices.

In designing an electronic device, thermal analysis is generally carried out to analyze junction temperatures of parts, surface temperatures of parts, atmospheric temperatures of a device and so forth.

Such thermal analysis is carried out on an analytic model (verified thermal analytic model, thermal analytic model) generated by modeling an analysis object on the basis of design data, for example. It is generally desirable to faithfully model the configuration of a component in making an analytic model. In analysis of an electronic device, modeling within a range from μm (parts level) to m (system level) is required. However, faithful modeling within such a wide range causes an increase in number of meshes, which leads to an increase in analysis period, or generation of hardware limitation such as lack of memory, etc.

To overcome the above drawbacks, upon thermal analysis of an electronic device, it is general to simplify design data within a permissible range of analysis period and analysis accuracy according to an analysis purpose such as analysis of junction temperatures of parts, analysis of surface temperatures of parts, analysis of atmospheric temperatures of a device and so forth, and generate an analytic model. For instance, when it is desired to analyze junction temperatures of parts, up to internal structures of the parts are modeled; when it is desired to analyze surface temperatures of parts, the parts are modeled to the extend that the surface temperatures thereof can be obtained. Further, when it is desired to analyze atmospheric temperatures or analyze a temperature distribution of the whole device, modeling of an internal structure thereof is not carried out because it is unnecessary.

Hereinafter, examples of known techniques for generating an analytic model will be explained with reference to FIG. 25 (G1 to G3, etc.).

First, a designer or the like prepares design data 81 of electronic device, using a design support tool such as CAD, EDA or the like. For example, a person exclusively appointed for analysis who has knowledge about thermal analysis beforehand prepares a simplified thermal parts model 82 for each component, and generates an analytic model 83 by automatically selecting a simplified thermal parts model 82 and applying it to each component on the basis of the design data 81 (refer to G1). Alternatively, for example, a person exclusively appointed for analysis beforehand prepares analytic model configuration examples 84 and analysis instances 85, and slims the design data 81 to make the design data 81 fit an analysis purpose, and prepares analytic design data 86 (refer to G2). The person exclusively appointed for analysis determines an analytic model generation method on the basis of the analytic design data 86, the analytic model configuration examples 84 and the analysis instances 85, and generates the analytic model 83 according to the determined analytic model generation method (refer to G3).

From the analytic model 83 generated in the above technique, analytic models (refer to "ANALYTIC MODELS 1, 2, . . . , N" in FIG. 25) are generated according to various purposes of thermal analysis (refer to "PURPOSES 1, 2, . . . , N" in FIG. 25), respectively. In the example shown in FIG. 25, N analytic models are generated, correspondingly to N purposes of thermal analysis.

In concrete, for example, a person exclusively appointed for analysis captures an analytic model suited to an analytic level representing a range of analysis object with the use of an intermediate file (IGES, STEP, STL, IDF, etc.) of the design data to optimize (tune) the analytic model, and generates an analytic model fitting the purpose of the thermal analysis on the basis of know-how of this person. Part of the analytic model can be shared, depending on an intention of the preparation, condition statement, etc. (diversion analysis using analytic model).

As other examples, Patent Document 1 below shows a technique in which when the user selects a shape pattern and an analytic evaluation item of an analysis object, the system demands the user to input size, angle, material and analytic condition parameters that the system needs in analysis; when the user inputs only the parameters, the system automatically generates a three-dimensional analytic model on the basis of the inputted parameters and modeling rule. Further, Patent Document 2 below shows a technique in which, in preparation of an analytic shape model from a real shape model, a screen of analytic conditions having a guidance function is displayed as soon as the user instructs shape operation, and the user selects an analytic condition from the screen to generate analytic condition, for example.

[Patent Document 1] Japanese Patent Laid-Open (Kokai) No. H10-187771

[Patent Document 2] Japanese Patent Laid-Open (Kokai) No. H09-138812

SUMMARY OF THE INVENTION

In the known analytic model generation methods, when analysis is performed with a plurality of purposes, it is necessary to manually generate a plurality of analytic models fitting the respective analysis purposes. For this, generation or sharing of the analytic models has to take a lot of time. Moreover, an increase in number of the analytic models causes necessity of management of data of a large number of the analytic models.

The known analytic model generation methods require skill of modeling. It is difficult for a person who is not skilled in analysis to generate an analytic model fitting an analysis purpose. Even a person exclusively appointed for time analysis finds a difficulty in answering all requests (analytic patterns) from the designer.

A result of analysis is obtained by executing analysis on an analytic model generated by a person exclusively appointed for analysis. However, lack of understanding of an intension of preparation of the analytic model could invite a failure to appropriately evaluate the result of analysis.

If a configuration component of a diverted analytic model is deleted in error or moved to a position beyond supposition when the analysis conditions are changed and analysis is performed, it may cause degradation of the analysis accuracy.

When an analytic model is diverted, re-generation of the analytic meshes or a change in analytic environments may cause a difficulty in estimating the analysis period. For this, there is a demand to estimate the convergence or the analysis period by pre-analysis or the like.

In the light of the above drawbacks, an object of the present invention is to readily generate an analytic model fitting an analysis purpose and improve the serviceability.

In a first aspect of the present invention, an analysis support system generating a purpose-specific analytic model used to analyze an analysis object comprised of a plurality of components according to an analysis purpose, the purpose-specific analytic model having an analytic component generated on the basis of the components, the analysis support system comprising an analysis purpose input section being able to input the analysis purpose; an analysis level designator designating an analysis level, representing a range for analysis, according to the analysis purpose inputted from the analysis purpose input section; a configuration information record section recording configuration information about other component to be combined with each of the components, the configuration information being associated with the analysis level; a purpose-specific component group generator generating a purpose-specific component group representing the analytic component that is to configure the purpose-specific analytic model, on the basis of the analysis level designated by the analysis level designator and the configuration information recorded in the configuration information record section; and an analytic model generator generating the purpose-specific analytic model on the basis of a basic analytic model having the analytic component corresponding to the analysis object and the purpose-specific component group generated by the purpose-specific component group generator.

It is preferable that the analysis object be in a hierarchical configuration that is a combination of a plurality of the analysis levels; the configuration information be information about the other component lower in analysis level than each of the components; the analysis support system further comprise a hierarchical configuration information record section recording hierarchical configuration information hierarchically representing information about the components configuring the analysis object, the hierarchical configuration information being associated with the configuration information; and the purpose-specific component group generator generate the purpose-specific component group on the basis of the analysis level designated by the analysis level designator, the configuration information recorded in the configuration information record section and the hierarchical configuration information recorded in the hierarchical configuration information record section.

It is preferable that the analysis support system further comprise a component selector being able to select the analytic component configuring the purpose-specific analytic model; wherein the purpose-specific component group generator generates the purpose-specific component group on the basis of the configuration information relating to the analytic component selected by the component selector, the analysis level designated by the analysis level designator and the configuration information recorded in the configuration information record section.

The analysis support system may further comprise an edition limitation information record section recording edition limitation information for limiting edition of each of the components; an edition condition input section being able to input an edition condition for the analytic component configuring the purpose-specific analytic model generated by the analytic model generator, within a range limited by the edition limitation information recorded in the edition limitation information record section; and an edited analytic model generator generating, from the purpose-specific analytic model generated by the analytic model generator, an edited analytic model according to the edition condition inputted from the edition condition input section.

The edition condition input section may be able to input replacement of the analytic component configuring the purpose-specific analytic model with a replacement candidate component in the basic analytic model, deletion of the analytic component configuring the purpose-specific analytic model or movement of the analytic component configuring the purpose-specific analytic model, as the edition condition.

The analysis support system may still further comprise a difference information generator generating difference information representing a difference between the purpose-specific analytic model generated by the analytic model generator and the edited analytic model generated by the edited analytic model generator.

The analysis support system may still further comprise an analysis processor executing analysis of the purpose-specific analytic model generated by the analytic model generator; an execution result information accumulation section accumulating execution result information representing a result of execution of the analysis by the analysis processor; and an analysis execution period estimator estimating an analysis execution period of the purpose-specific analytic model on the basis of the execution result information accumulated in the execution result information accumulation section.

In a second aspect of the present invention, an analysis support method generating a purpose-specific analytic model used to analyze an analysis object comprised of a plurality of components according to an analysis purpose, the purpose-specific analytic model having an analytic component generated on the basis of the components, the analysis support method comprising the steps of (i) inputting the analysis purpose; (ii) designing an analysis level, representing a range for analysis, according to the analysis purpose inputted from the step (i); (iii) recording configuration information about other component to be combined with each of the components in a configuration information record section, the configuration information being associated with the analysis level; (iv) generating a purpose-specific component group representing the analytic component that is to configure the purpose-specific analytic model, on the basis of the analysis level designated at the step (ii) and the configuration information recorded in the configuration information record section; and (v) generating the purpose-specific analytic model on the basis of a basic analytic model having the analytic component corresponding to the analysis object and the purpose-specific component group generated at the step (iv).

It is preferable that the analysis object be in a hierarchical configuration that is a combination of a plurality of the analysis levels; the configuration information be in format ion about the other component lower in analysis level than each of the components; the analysis support method further comprise a step of (vi) recording hierarchical configuration information hierarchically representing information about the components configuring the analysis object in a hierarchical configuration information record section, the hierarchical configuration information being associated with the configuration information; and, at the step (iv), the purpose-specific component group be generated on the basis of the analysis level designated at the step (ii), the configuration information recorded in the configuration information record section and the hierarchical configuration information recorded in the hierarchical configuration information record section.

It is preferable that the analysis support method further comprise the step of (vii) being able to select the analytic component configuring the purpose-specific analytic model; wherein, at the step (iv), the purpose-specific component group is generated on the basis of the configuration information relating to the analytic component selected at the step (vii), the analysis level designated at the step (ii) and the configuration information recorded in the configuration information record section.

The analysis support method may further comprise the steps of (viii) recording edition limitation information limiting edition of each of the components in an edition limitation information record section; (ix) being able to input an edition condition for the analytic component configuring the purpose-specific analytic model generated at the step (v) within a range limited by the edition limitation information recorded in the edition limitation information record section; and (x) generating an edited analytic model according to the edition condition inputted at the step (ix) from the purpose-specific analytic model generated at the step (v).

The analysis support method may further comprise the steps of (xi) executing analysis of the purpose-specific analytic model generated at the step (v); (xii) accumulating execution result information representing a result of execution of analysis at the step (xi) in an execution result information accumulation section; and (xiii) estimating an analysis execution period of the purpose-specific analytic model on the basis of the execution result information accumulated in the execution result information accumulation section.

In a third aspect of the present invention, a computer readable recording medium storing an analysis support program for causing a computer to execute an analysis support function of generating a purpose-specific analytic model used to analyze an analysis object comprised of a plurality of components according to an analysis purpose, the purpose-specific analytic model having an analytic component generated on the basis of the components, the analysis support program causing the computer function as an analysis purpose input section being able to input the analysis purpose; an analysis level designator designating an analysis level, representing a range for analysis, according to the analysis purpose inputted from the analysis purpose input section; a purpose-specific component group generator generating a purpose-specific component group representing the analytic component that is to configure the purpose-specific analytic model, on the basis of the analysis level designated by the analysis level designator and model configuration information made by associating configuration information about other component to be combined with each of the components with the analysis level; and an analytic model generator generating the purpose-specific analytic model on the basis of a basic analytic model having the analytic component corresponding to the analysis object and the purpose-specific component group generated by the purpose-specific component group generator.

It is preferable that the analysis object be in a hierarchical configuration that is a combination of a plurality of the analysis levels, the configuration information be information about the other component lower in analysis level than each of the components; and the purpose-specific component group generator generate the purpose-specific component group on the basis of the analysis level designated by the analysis level designator, model hierarchy information made by associating hierarchical configuration information representing the hierarchical configuration of the analysis object with the configuration information and the hierarchical configuration information recorded in a hierarchical configuration information record section.

It is preferable that the analysis support program further cause the computer to function as a component selector being able to select the analytic component configuring the purpose-specific analytic model; the purpose-specific component group generator generate the purpose-specific component group on the basis of the configuration information relating to the analytic component selected by the component selector, the analysis level designated by the analysis level designator and the configuration information recorded in a configuration information record section.

The analysis support program may further cause the computer to function as an edition condition input section being able to input an edition condition for the analytic component configuring the purpose-specific analytic model generated by the analytic model generator, within a range limited by the edition limitation information for limiting edition of each of the components; and an edited analytic model generator generating, from the purpose-specific analytic model generated by the analytic model generator, an edited analytic model according to the edition condition inputted from the edition condition input section.

The analysis support program may further cause the computer to function as an analysis processor executing analysis of the purpose-specific analytic model generated by the analytic model generator; and an analysis execution period estimator estimating an analysis execution period of the purpose-specific analytic model on the basis of execution result information representing a result of execution of analysis by the analysis processor.

In a fourth aspect of the present invention, an analysis support apparatus generating a purpose-specific analytic model used to analyze an analysis object comprised of a plurality of components according to an analysis purpose, the purpose-specific analytic model having an analytic component generated on the basis of the components, the analysis support apparatus comprising an analysis purpose input section being able to input the analysis purpose; an analysis level designator designating an analysis level, representing a range for analysis, according to the analysis purpose inputted from the analysis purpose input section; a purpose-specific component group generator generating a purpose-specific component group representing the analytic component that is to configure the purpose-specific analytic model, on the basis of the analysis level designated by the analysis level designator and model configuration information made by associating configuration information about other component to be combined with each of the components with the analysis level; and an analytic model generator generating the purpose-specific analytic model on the basis of a basic analytic model having the analytic component corresponding to the analysis object and the purpose-specific component group generated by the purpose-specific component group generator.

It is preferable that the analysis object be in a hierarchical configuration that is a combination of a plurality of the analysis levels; the configuration information be information about the other component lower in analysis level than each of the components; and the purpose-specific component group generator generate the purpose-specific component group on the basis of the analysis level designated by the analysis level designator, model hierarchy information made by associating hierarchical configuration information representing the hierarchical configuration of the analysis object with the configuration information and the hierarchical configuration information recorded in a hierarchical configuration information record section.

The analysis support apparatus may further comprise an analysis processor executing analysis of the purpose-specific analytic model generated by the analytic model generator; and an analysis execution period estimator estimating an analysis execution period of the purpose-specific analytic model on the basis of execution result information representing a result of execution of analysis by the analysis processor.

According to the present invention, an analysis level is designated according to an inputted analysis purpose, a purpose-specific component group is generated on the basis of the designated analysis level and configuration information, and a purpose-specific analytic model is automatically generated according to the analysis purpose from the basic analytic model. Even a designer or the like who does not have knowledge about analysis can readily carry out analysis fitting each analysis purpose and can readily manage the analysis model. Automatic generation of a purpose-specific analytic model can eliminate a process of generating a purpose-specific analytic model by a person exclusively appointed for analysis and enables a designer or the like who does not have knowledge about analysis to smoothly do a series of work such as design, analysis and verification. Further, automatic generation of a purpose-specific analytic mode can prevent degradation of the analysis accuracy because the purpose-specific analytic model generation process does not include any manual work.

Since edition conditions for an analytic component configuring a purpose-specific analytic model can be input within a range limited by edition limitation information, it is possible to prevent a designer or the like who does not have knowledge about analysis from performing operations such as deleting an analytic component configuring the purpose-specific analytic mode in error, moving the analytic component to a position beyond supposition and so forth, which is effective to prevent degradation of the analysis accuracy.

By displaying a difference between a purpose-specific analytic model and an edited analytic mode, it is possible to evaluate a result of analysis on an edited analytic model with certainty.

Since an analysis execution period for a purpose-specific analytic model is estimated on the basis of execution result information accumulated in the execution result information accumulation section, it is possible to omit unnecessary (excessive) analysis.

BRIEF DESCRIPTION OF THE DRAWINGS

FIG. 20 is a diagram for illustrating execution result information in the analysis support system according to the embodiment of this invention;

DESCRIPTION OF THE PREFERRED EMBODIMENTS

Hereinafter, embodiments of the present invention will be described with reference to the accompanying drawings.

[1] Description of an Embodiment of the Invention

Figure 1:
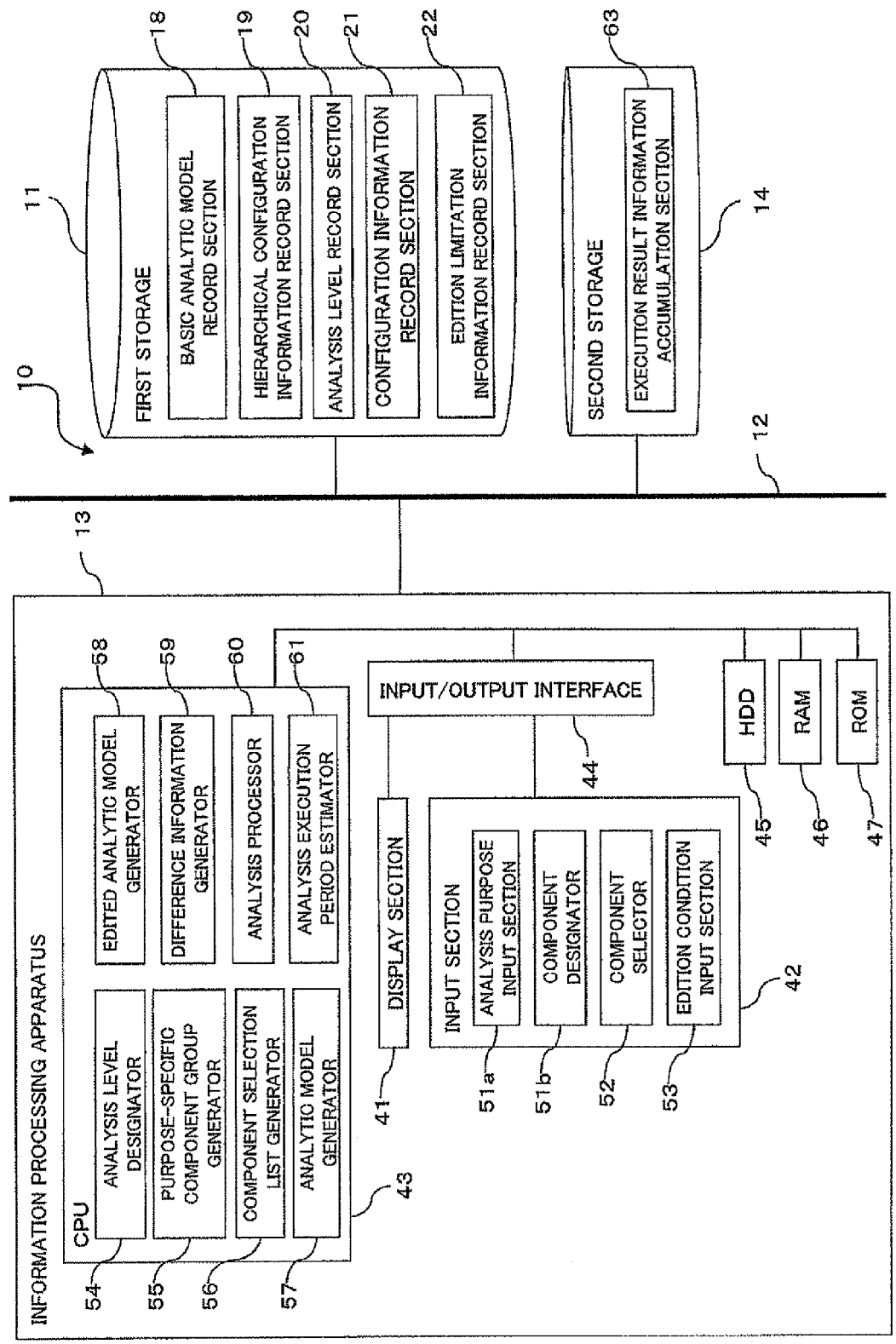
FIG. 1 is a diagram schematically showing an example of configuration of an analysis support system according to an embodiment of this invention.
Figure 2:
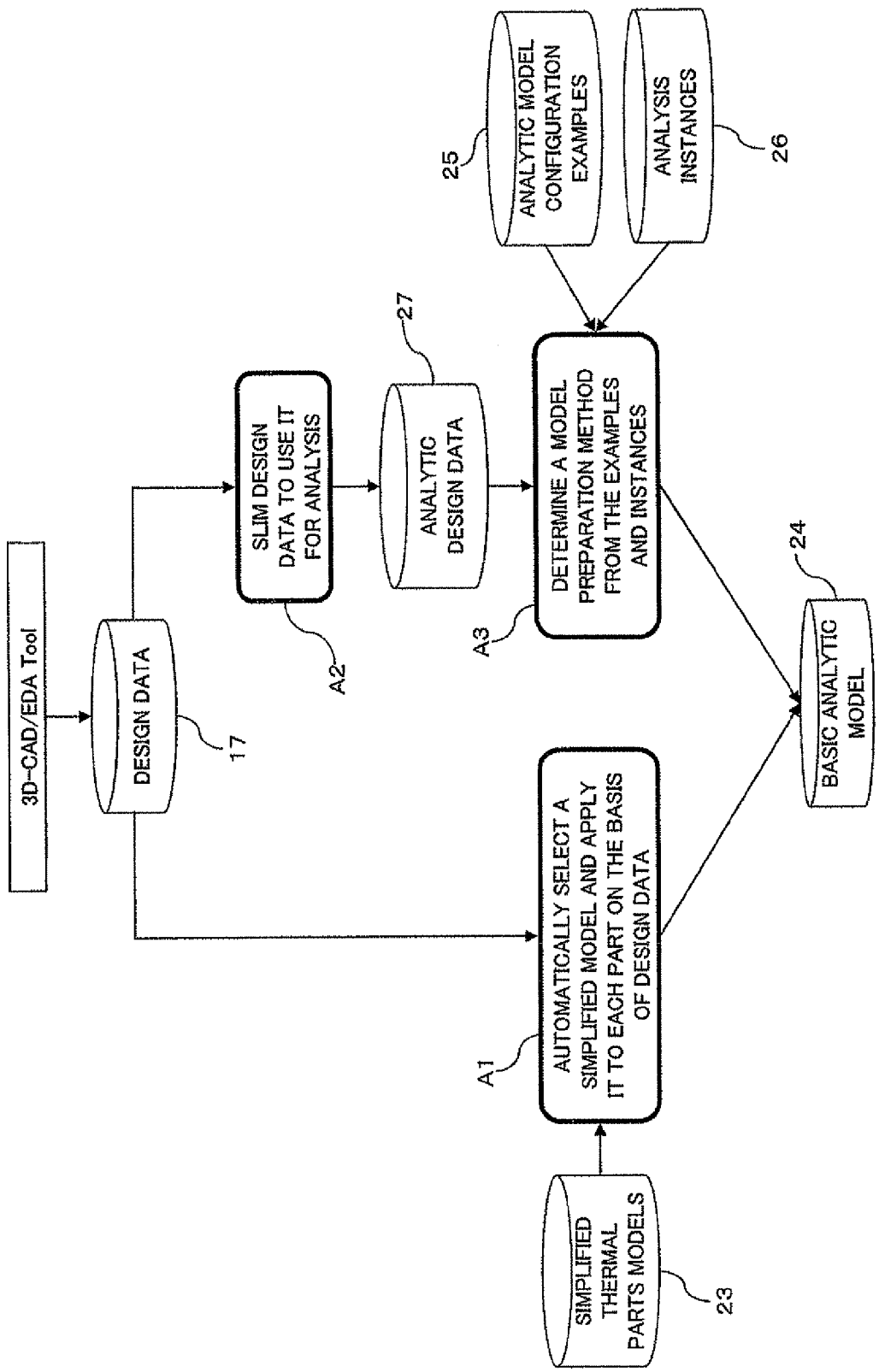
FIG. 2 is a diagram for illustrating an example of basic analytic model generation method in the analysis support system according to the embodiment of this invention.

FIG. 1 is a schematic diagram showing an example of configuration of an analysis support system according to an embodiment of the present invention. FIG. 2 is a diagram for illustrating an example of basic analytic model generation method.

An analysis support system 10 according to this embodiment has, as shown in FIG. 1, a first storage 11, an information processing apparatus (analysis support apparatus) 13 connected to the first storage 11 over a network 12, and a second storage 14 connected to the information processing apparatus 13 over the network 12. In terms of an electronic device (analysis object) comprised of a plurality of components (parts), for example, the analysis support system 10 generates a purpose-specific analytic model (extracted analytic model, thermal analytic model in conformity with an analysis purpose; not shown) used to carry out analysis according to an analysis purpose (intension of analysis, analytic model extracted definition) from a basic analytic model (verified thermal analytic model, thermal analytic model; not shown) beforehand generated on the basis of design data of the electronic device.

Hereinafter, this invention will be described by way of an example where thermal analysis is carried out as an example of analysis.

The first storage 11 is a device storing various sorts of information, functioning as a basic analytic model record section 18, a hierarchical configuration information record section 19, an analysis level record section 20, a configuration information record section 21 and an edition limitation information record section 22, as shown in FIG. 1. The first storage 11 is accomplished with an HDD in a computer connected over an LAN (Local Area Network) or an HDD directly connected to the LAN, for example. Note that the first storage 11 is not limited to an HDD, but may be any one of various known storage devices.

The basis analytic model record section 18 records a basis analytic model modeled for analysis on the basis of design data or the like of the electronic device.

The basic analytic model is made up of information required when analysis is carried out, having a plurality of analytic components (not shown) corresponding to a plurality of components configuring the electronic device. The basic analytic model also includes information such as meshes, etc.

Now, an example of method of generating a basic analytic model will be described with reference to FIG. 2 (A1 to A3, etc.)

First, a designer or the like prepares design data 17 of an electronic device with the use of a design support tool such as CAD (Computer Aided Design), EDA (Electronic Design Automation) or the like. A person exclusively appointed for analysis who has knowledge about thermal analysis, for example, beforehand prepares a simplified thermal parts model 23 of each component, and generates a basic analytic model 24 by automatically selecting a simplified parts model 23 and applying it to each component on the basis of the design data 17 (refer to A1). Alternatively, a person exclu- sively appointed for analysis, for example, beforehand prepares analytic model configuration examples 25 and analysis instances 26, slims the design data 17 to make analytic design data 27 fitting the analysis (refer to A2), determines an analytic model generation method on the basis of the analytic design data 27, the analytic model configuration examples 25 and the analysis instances 26, and generates the basic analytic model 24 in the determined analytic model generation method (refer to A3).

The hierarchical configuration information record section 19 records hierarchical configuration information (existing analytic model tree) 29. The analysis level record section 20 associates a plurality of analysis levels with the hierarchical configuration information 29 and stores the analysis levels and the hierarchical configuration information 29. The configuration information record section 21 associates a detail level (configuration information) with the analysis level, and stores the detail level and the analysis level. The edition limitation information record section 22 records edition limitation information.

Hereinafter, description will be made of an example of configuration of the hierarchical configuration information 29, analysis levels, detail levels and edition limitation information, with reference to an electronic device 16A shown in FIG. 3.

Figure 3:
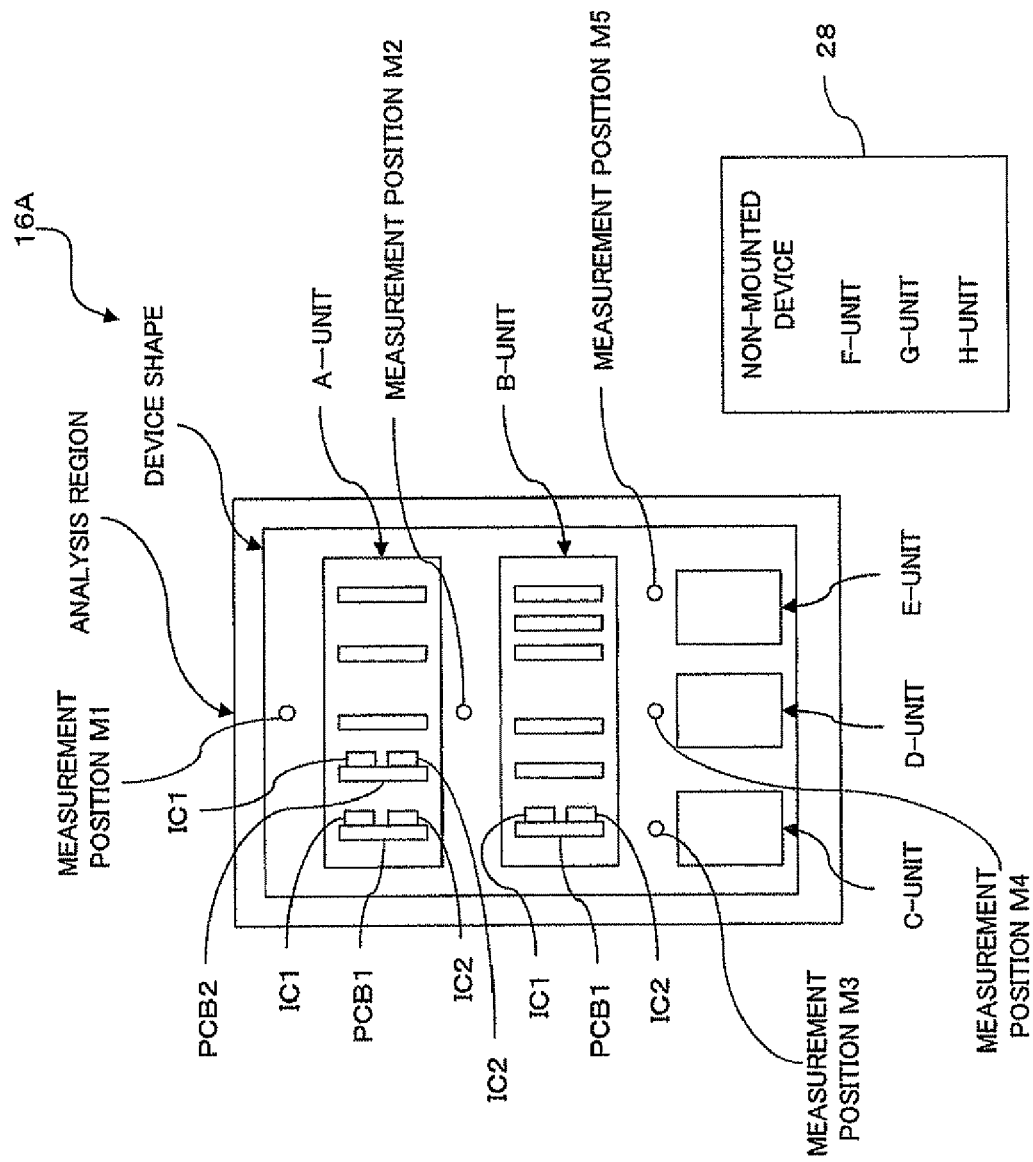
FIG. 3 is a diagram schematically showing an example of hardware configuration of an electronic device in the analysis support system according to the embodiment of this invention.
Figure 4:
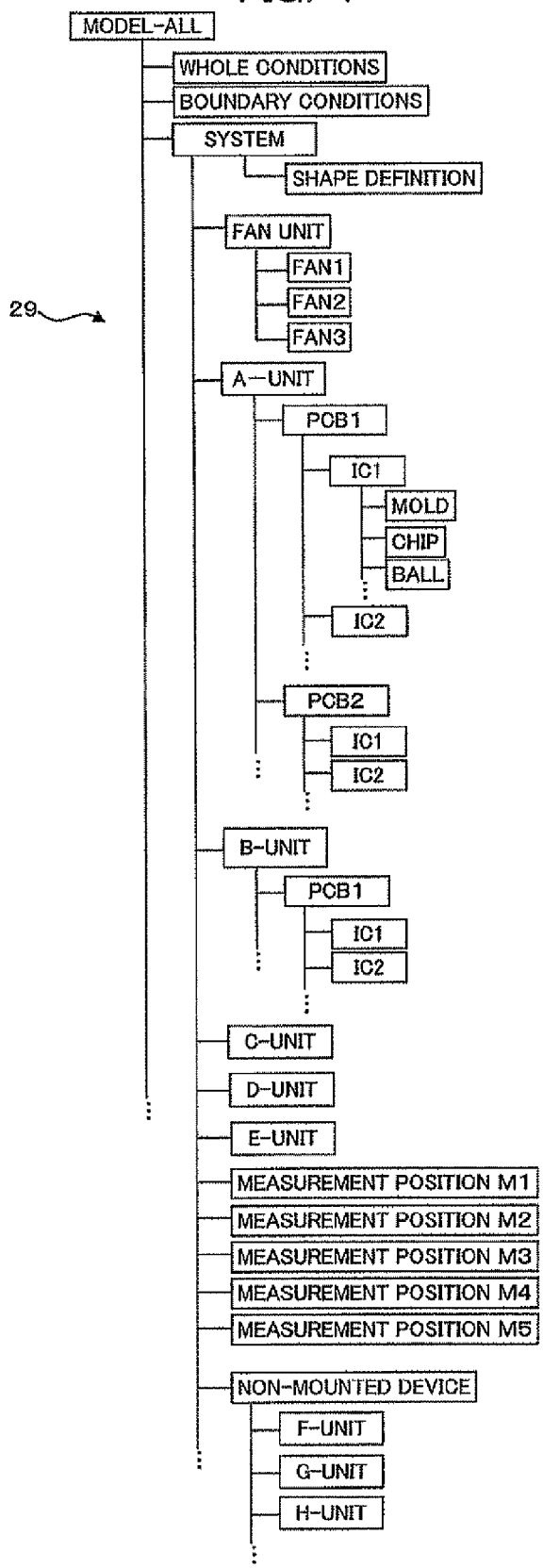
FIG. 4 is a diagram for illustrating hierarchical configuration information in the analysis support system according to the embodiment of this invention.
Figure 5:
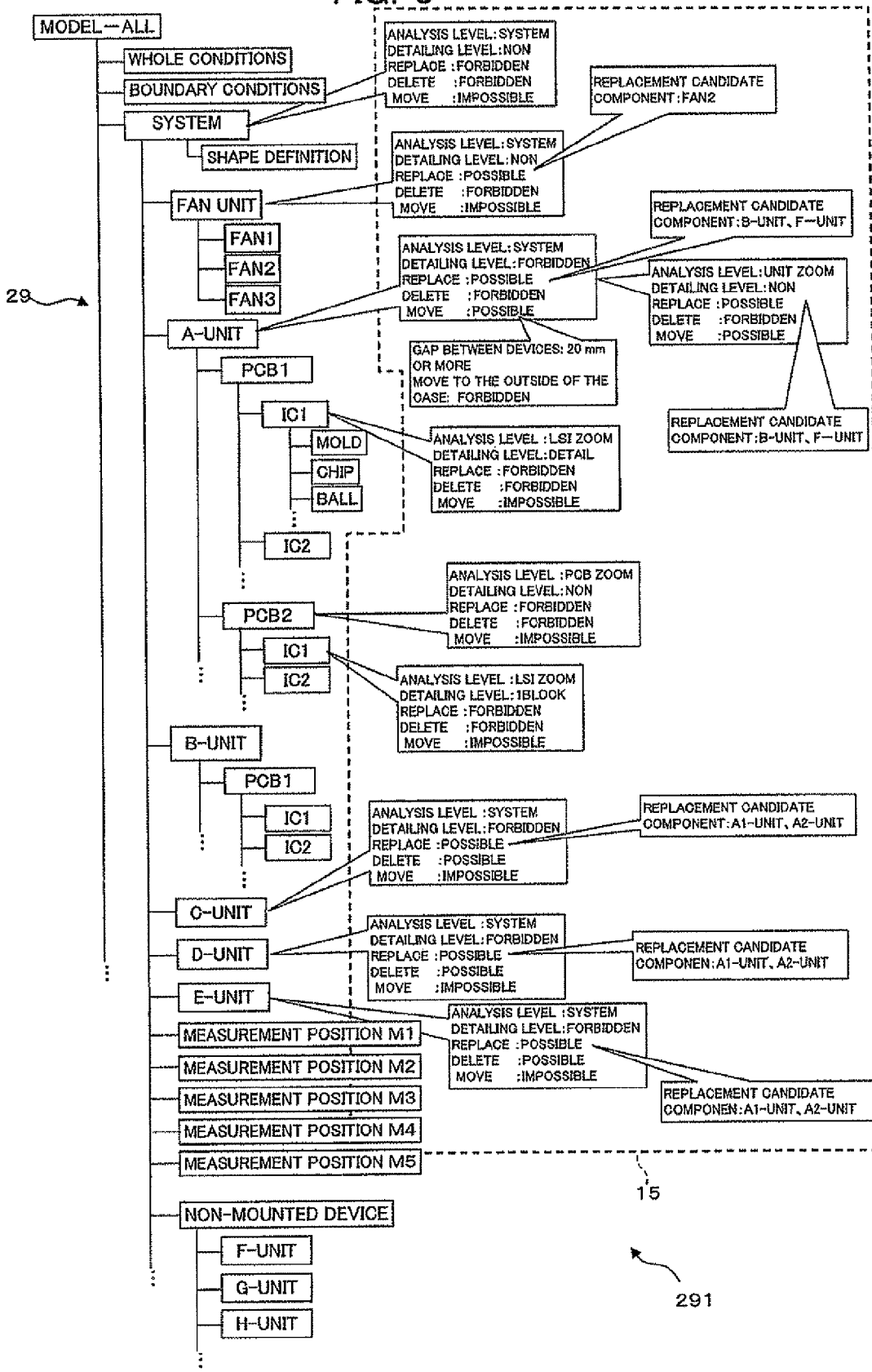
FIG. 5 is a diagram for illustrating a relationship among the hierarchical configuration information, analysis level, configuration information and edition limitation information in the analysis support system according to the embodiment of this invention.

FIG. 3 is a diagram schematically showing an example of configuration of hardware of an electronic device. FIG. 4 is a diagram for illustrating the hierarchical configuration information in the analysis support system according to the embodiment of this invention. FIG. 5 is a diagram for illustration relationships among the hierarchical configuration information, the analysis levels, configuration information and the edition limitation information.

In the drawings, like reference characters designate like or corresponding parts, detailed description of which are thus omitted.

The electronic device 16A has, for example, A-UNIT, B-UNIT, C-UNIT, D-UNIT, E-UNIT, etc., as shown in FIG. 3. The electronic device 16A is in a hierarchical configuration which is a combination of a plurality of levels. For example, PCB (Printed Circuit Board) 1, PBC2, etc. are arranged in A-UNIT. IC1, IC2, etc. are arranged in each of PCBs 1 and 2. MOLD, CHIP, BALL (all not shown), etc. are arranged in each of ICs 1 and 2. PCB 1, etc. are arranged in B-UNIT. As non-mounted apparatuses 287 F-UNIT, G-UNIT, H-UNIT, etc. (all not shown) exist.

On the electronic device 16A, there are set measurement positions M1 to M5 which are positions at which various sorts of measurement are taken. The measurement position M1 is set above A-UNIT (above A-UNIT on the paper), the measurement position M2 between A-UNIT and B-UNIT, the measurement position M3 between B-UNIT and C-UNIT, the measurement position M4 between B-UNIT and D-UNIT, and the measurement position M5 between B-UNIT and B-UNIT. In the electronic device 16A, FAN1, FAN2 and FAN3 are set as FAN UNITs (refer to FIG. 4).

Detailed explanation of the configuration of the electronic device 16A excepting the above is omitted for the sake of convenience.

The hierarchical configuration information 29 hierarchically represents information about components (UNIT, PCB, IC, etc.) configuring the electronic device 16A. For example, the hierarchical configuration information 29 hierarchically represents, in a tree structure, names of components configuring the electronic device 16A, and analysis conditions to be set when analysis is carried out on an analytic model corresponding to the electronic device 16A.

The example in FIG. 4 shows that the hierarchical configuration information 29 has whole conditions, boundary conditions and SYSTEM.

The whole conditions are used when analysis is executed on an analytic model corresponding to the electronic device 16A. The boundary conditions are used when analysis is executed on an analytic model corresponding to the electronic device 16A.

SYSTEM is added shape definitions as a lower level used to define shapes of components configuring the electronic device 16A. Further, System is hierarchically added information representing parts configurations of all components configuring the electronic device 16A as lower levels.

In the example in FIG. 4, SYSTEM has FAN UNIT, A-UNIT, B-UNIT, C-UNIT, D-UNIT and E-UNIT, together with a measurement position M1, a measurement position M2, a measurement position M3, a measurement position M4, a measurement position M5, non-mounted apparatuses, etc.

SYSTEM has FAN1, FAN2 and FAN3 on a level immediately below FAN UNIT, PCB1, PCB2, etc. on a level immediately below A-UNIT; IC1, IC2, etc. on a level immediately below PCB1; MOLD, CHIP, BALL, etc. on a level immediately below IC1; and IC1, IC2, etc. on a level immediately below PCB2.

SYSTEM further has PCB1, etc. on a level immediately below B-UNIT; and IC1, IC2, etc. on a level immediately below this PCB1.

SYSTEM still further has F-UNIT, G-UNIT, H-UNIT, etc. on a level immediately below the non-mounted devices.

In the hierarchical configuration information 29 shown in FIG. 4, a component name (part name) of each part is used to specify each of the above-mentioned components (configuration components).

Hereinafter, when one component name among a plurality of component names hierarchically represented is specified, this component name is occasionally expressed by a path name that is noted in a way that component names from the highest level down to lower levels are arranged in order, with "/(slash)" therebetween. For instance, IC1 on a level immediately below PCB1 in A-UNIT in FIG. 4 can be expressed by its path name as "Model-All/System/A-Unit/PCB1/IC1".

In the example shown in FIG. 4, names of components configuring the hierarchical configuration information 29 are represented in a tree-like hierarchy (tree structure). However, the present invention is not limited to this example, but the hierarchical configuration information 29 can be realized in a desirable one of a variety of known methods representing hierarchically information about components configuring the electronic device 16A.

In the hierarchical configuration information 29 configured as above, attribute information 15 including analysis level, detail level (configuration information) and edition limitation information is added (set) to each component name, whereby model configuration information 291 is configured, as shown in FIG. 5.

In concrete, the attribute information 15 comprised of analysis level, detail level and edition limitation information is associated with each of component names configuring the hierarchical configuration information 29 to configure the model configuration information 291. Hereinafter, associating or adding some information with or to a component (component name) is occasionally referred simply as associating with (or adding to) a component name. In this embodiment, a component configuring the electronic device 16A is specified with a component name. Namely, it can be said that the model configuration information 291 is configured by associating the hierarchical structure information 29 with the detail levels.

The analysis level is information representing a range of analysis object at the time that analysis is executed on an analytic model corresponding to the electronic device 16A. The analysis level is attached to each of component names configuring the hierarchical configuration information 29. In this embodiment, "SYSTEM", "UNIT ZOOM," "PCB ZOOM", "LSI ZOOM", etc. are used as the analysis level, for example.

"SYSTEM" represents that a range of analysis object is the whole system. "UNIT ZOOM" represents that a range of analysis object is UNIT level, and also represents that analysis is not executed on components lower in level than FAN UNIT, A-UNIT, B-UNIT, C-UNIT, D-UNIT, E-UNIT and the like.

"PCB ZOOM" represents that a range of analysis object is PCB level, also representing that analysis is not executed on components on levels below PCB1, PCB2 and the like. "LSI ZOOM" represents that a range of analysis object is LSI (IC) level, also representing that analysis is not executed on components on levels below IC1, IC2 and the like.

In the example shown in FIG. 5, an analysis level "SYSTEM" is attached to "Model-All/System", "Model-All/System/Fan Unit", "Model-All/System/A-Unit", "Model-All/System/C-Unit", "Model-All/System/D-Unit" and "Model-All/System/E-Unit" configuring the hierarchical configuration information 29; an analysis level "UNIT ZOOM" is attached to "Model-All/System/A-Unit"; an analysis level "PCB ZOOM" is attached to "Model-All/System/A-Unit/PCB2"; and an analysis level "LSI ZOOM" is attached to "Model-All/System/A-Unit/PCB1/IC1" and "Model-All/System/A-Unit/PCB2/IC1".

The analysis level is also attached to each component name other than the above-noted hierarchical configuration information 29, detailed explanation of which is here omitted for the sake of convenience.

The detail level represents information relating to other component to be combined with a relevant component configuring the electronic device 16A. Like the above-noted analysis level, the detail level is associated with and added to each of the component names configuring the hierarchical configuration information 29. The detail level is set to each analysis level.

The detail level represents information relating to components (other components; hereinafter referred to as lower components) lower in level than an associated component (hereinafter referred to as a relevant component) In this embodiment, "NON", "forbidden", "1 Block", "Detail", etc. are used as the detail level, for example.

"NON" represents that components lower in level than a relevant component are not expanded (detail level non-expanded). "Forbidden" represents that expanding components lower in level than a relevant component is forbidden (detail level expansion forbidden). "1 Block" represents that a component on one level below a level of a relevant component is to be expanded (one component expanded). "Detail" represents that all components lower in level than a relevant component are to be expanded (N components expanded).

By adding (setting) any one of these kinds of the detail level "NON", "forbidden", "1 Block" and "Detail" to each component name or each analysis level, components to be combined when a purpose-specific analytic model to be described later is generated is shown.

In concrete, as shown in FIG. 5, for example, each of "Model-All/System" and "Model-All/System/Fan Unit"

configuring the hierarchical configuration information 29 is added a detail level "NON", in association with an analysis level "SYSTEM". To "Model-All/System/A-Unit", "forbidden" is added in association with an analytic level "SYSTEM", and a detail level "NON" is added correspondingly to an analysis level "UNIT ZOOM". To each of "Model-All/System/C-Unit", "Model-All/System/D-Unit" and "Model-All/System/E-Unit", a detail level "forbidden" is added in association with an analysis level "SYSTEM".

Further, to "Model-All/System/A-Unit/PCB1/IC1", a detail level "DETAIL" is added in association with an analysis level "LSI ZOOM", for example. To "Model-All/System/A-Unit/PCB2", a detail level "NON" is added in association with an analysis level "PCB ZOOM". Still further, to "Model-All/System/A-Unit/PCB2/IC1", a detail level "1 BLOCK" is added in association with an analysis level "LSI ZOOM".

The detail level is added to each component name other than the above-mention component names in the hierarchical configuration information 29 in the similar manner although not shown in FIG. 5, explanation of which is omitted for the sake of convenience.

The edition limitation information represents information that limits edition of each component configuring the electronic device 16A. Like the analysis level and detail level described above, plural kinds of the edition limitation information are added to each component name configuring the hierarchical configuration information 29, in association therewith. Therefore, the edition limitation information is associated with each analytic component configuring a basic analytic model and a purpose-specific analytic model to be described later.

In this embodiment, use of the edition limitation information makes it possible to arbitrarily limit three kinds of edition operation of; replacing an analytic component configuring a purpose-specific analytic model with a replacement candidate component in a basic analytic model (hereinafter referred to simply as "replace"); deleting an analytic component configuring a purpose-specific analytic model (hereafter referred to simply as "delete"); and moving an analytic component configuring a purpose-specific analytic model (change in placement state; hereinafter referred to simply as "move").

In concrete, "forbidden" representing that "replace" is forbidden or "possible" representing that "replace" is permitted is selectively used as an edition item of "replace". Further, when "possible" is added and set, a replacement candidate component can be set. As an edition item of "delete", "forbidden" representing that "delete" is forbidden or "possible" representing that "delete" is permitted is selectively used. Further, as an edition item of "move", "impossible" representing that "move" is forbidden or "possible" representing that "move" is permitted is selectively used. When "possible" is added and set, a limitation condition of "move" can be additionally set.

In the example shown in FIG. 5, replacement "forbidden", deletion "forbidden" and movement "impossible" are added as the edition limitation information to "Model-All/System" configuring the hierarchical configuration information 29, for example. To "Model-All/System/Fan Unit", replacement "possible" and replacement candidate component "FAN2", deletion "forbidden" and movement "impossible" are added as the edition limitation information. Further, to "Model-All/System/A-Unit", replacement "possible" and replacement candidate components "B-UNIT" and "F-UNIT", deletion "forbidden", and movement "possible" and "gap between devices: 20 mm or more, move to outside the case: forbidden" as movement limitation conditions are added as the edition limitation information.

The edition limitation information is added to other components than the above-mentioned components in the hierarchical configuration information 29 in the similar manner although not shown in FIG. 5, explanation of which is omitted for the sake of convenience.

The information processing apparatus 13 has a display section 41, an input section 42, a CPU (Central Processing Unit) 43, an input/output interface 44, an HDD (Hard Disk Drive) 45, a RAM (Random-Access Memory) 46 and a ROM (Read-Only Memory) 47, as shown in FIG. 1. The CPU 43 executes an OS (Operating System) or a variety of programs (analysis support programs) stored in the HDD 45, the first storage 11 and second storage 14 to accomplish a variety of functions. Namely, the HDD 45, the first storage 11 and the second storage 14 store the OS and programs, as well.

The display section 41 displays various sorts of information about the information processing apparatus 13. The display section 41 displays an analysis purpose input screen 41a (refer to FIG. 6), a component selection screen 41b (extraction condition selection screen; refer to FIG. 12 to be described later), an analytic model display screen 41c (refer to FIGS. 14 and 15 to be described later), difference display screens 41d-1 and 41d-2 (refer to FIGS. 18 and 19 to be described later), for example. These screens 41a, 41b and 41c displayed on the display section 41 function as GUI (Graphical User Interface) screens, for example.

The input section 42 is used for various inputs or operations by a user or the like to input data, contents of instructions, etc. to the information processing apparatus 13, having a mouse and a keyboard. The input section 42 functions as an analysis purpose input section 51a, a component designator 51b, a component selector 52 and an edition condition input section 53. The component selector 52 and the edition condition input section 53 will be described later in detail.

Figure 6:
FIG. 6 is a diagram for illustrating an analysis purpose input screen in the analysis support system according to the embodiment of this invention.

FIG. 6 is a diagram for illustrating the analysis purpose input screen in the analysis support system according to the embodiment of this invention.

The analysis purpose input section 51a is used to input an analysis purpose. With the aid of the analysis purpose input section 51a, the user can directly input an analysis purpose in a text form (a character string "JUNCTION TEMPERATURE ANALYSIS" shown in an example in FIG. 6) on the analysis purpose input screen 51a shown in FIG. 6, for example. In the example in FIG. 6, the analysis purpose input section 51a enables the user to input an analysis purpose, for example, in Japanese Language.

The component designator 51b is used to designate a component name of an analysis object when the user inputs an analysis purpose on the analysis purpose input screen 41a, where the user can arbitrarily designate an additional component name as an analysis object if necessary. The component designator 51b enables the user to designate (select, input) component names of components on various levels such as IC, PCB, UNIT, etc. as an analysis object on the analysis purpose input screen 41a shown in FIG. 6, for example, where the user can selectively designate "designated" or "not designated" for each of an analysis object IC, an analysis object PCB and an analysis object UNIT. When the user selects "designated" for any one of these items, the component designator 51b enables the user to input a component name to be included in the analysis object in a text form, in association with an item at which "designated" is selected. The component designator 51b also enables the user to arbitrarily designate (set) an analysis level to the designated analysis object.

In the example shown in FIG. 6, by means of the component designator 51b, the user selects "designated" for an item of analysis object IC, "designated" for an item of analysis object PBC, "not designated" for an item of analysis object UNIT, and "not designated" for an item of analysis level, and, further, inputs "IC1" to the item of analysis object IC where "designated" is selected and "PCB1 and PCB2" to the item of analysis object PCB where "designated" is selected on the analysis purpose input screen 41a.

Note that the component designator 51b is not limited to this embodiment, but a variety of known techniques which can designate a component name are employable. For instance, when a component name is inputted, an item corresponding to the inputted component name can be automatically changed from a display of "not designated" to a display of "designated", or choices are beforehand prepared to enable the user to select one from the choices, instead of text input.

The CPU 43 performs a variety of numeral calculations, information processing, equipment control, etc. at a processing terminal. The CPU 43 functions as an analysis level designator 54, a purpose-specific component group generator 55, a component selection list generator 56, an analytic model generator 57, an edited analytic model generator 58, a difference information generator 59, an analysis processor 60 and an analysis execution period estimator 61.

The analysis level designator 54 designates an analysis level corresponding to an analysis purpose inputted through the analysis purpose input section 51a. For instance, a keyword that can be inputted as an analysis purpose (analysis purpose sentence) and an analysis level corresponding to this keyword are beforehand defined as definition information, and an analysis level matching the analysis purpose inputted by means of the analysis purpose input section 51a is automatically designated.

Practically, when "JUNCTION TEMPERATURE ANALYSIS" is inputted from the analysis purpose input section 51a, for example, the analysis level designator 54 designates an analysis level "LSI ZOOM" among a plurality of analysis levels registered beforehand. When a character string "SURFACE TEMPERATURE ANALYSIS" is inputted from the analysis purpose input section 51a, the analysis level designator 54 designates "PCB ZOOM" among the plural analysis levels registered beforehand. When a character string "ATMOSPHERIC TEMPERATURE ANALYSIS" is inputted from the analysis purpose input section 51a, the analysis level designator 54 designates an analysis level "UNIT ZOOM" among the plural analysis levels registered beforehand. When a character string "TEMPERATURE DISTRIBUTION ANALYSIS OF WHOLE SYSTEM" is inputted from the analysis purpose input section 51a, the analysis level designator 54 designates an analysis level "SYSTEM" among the plural analysis levels registered beforehand. When an analysis purpose inputted from the analysis purpose input section 51a does not coincide with any analysis purpose defined beforehand, the analysis level designator 54 does not designate an analysis level, but demands confirmation.

Note that the method of designating an analysis level by the analysis level designator 54 is not limited to this embodiment. Alternatively, a variety of known methods are employable so long as it can designate an analysis level matching an analysis purpose inputted from the analysis purpose input section 51a.

The purpose-specific component group generator 55 generates a purpose-specific component group formed by component names extracted from the hierarchical configuration information 29 according to an analysis purpose. The purpose-specific component group generator 55 generates a purpose-specific component group (refer to a reference character 62a in FIG. 8 and reference character 62b in FIG. 10, etc.) on the basis of an analysis level designated by the analysis level designator 54, a detail level recorded in the configuration information record section 21 and the hierarchical configuration information 29 recorded in the hierarchical configuration information record section 19.

In concrete, the purpose-specific component group generator 55 extracts a component name corresponding to an analysis level designated by the analysis level designator 54 and component names specified by a detail level added to this component name from the hierarchical configuration information 29 recorded by the hierarchical configuration record section 19, for example, and hierarchically associates the extracted component names to generate a purpose-specific component group. A hierarchical combination of component names in the purpose-specific component group is configured on the basis of the hierarchical configuration information 29.

Component names configuring the purpose-specific component group are associated with analytic component that is to configure a purpose-specific analysis model to be described later.

Hereinafter, generation of a purpose-specific component group will be explained with reference to a first practical example shown in FIGS. 7 and 8, and a second practical example shown in FIGS. 9 and 10 as practical examples using the electronic device 16A shown in FIG. 3.

(A) Description of First Practical Example

Figure 7:
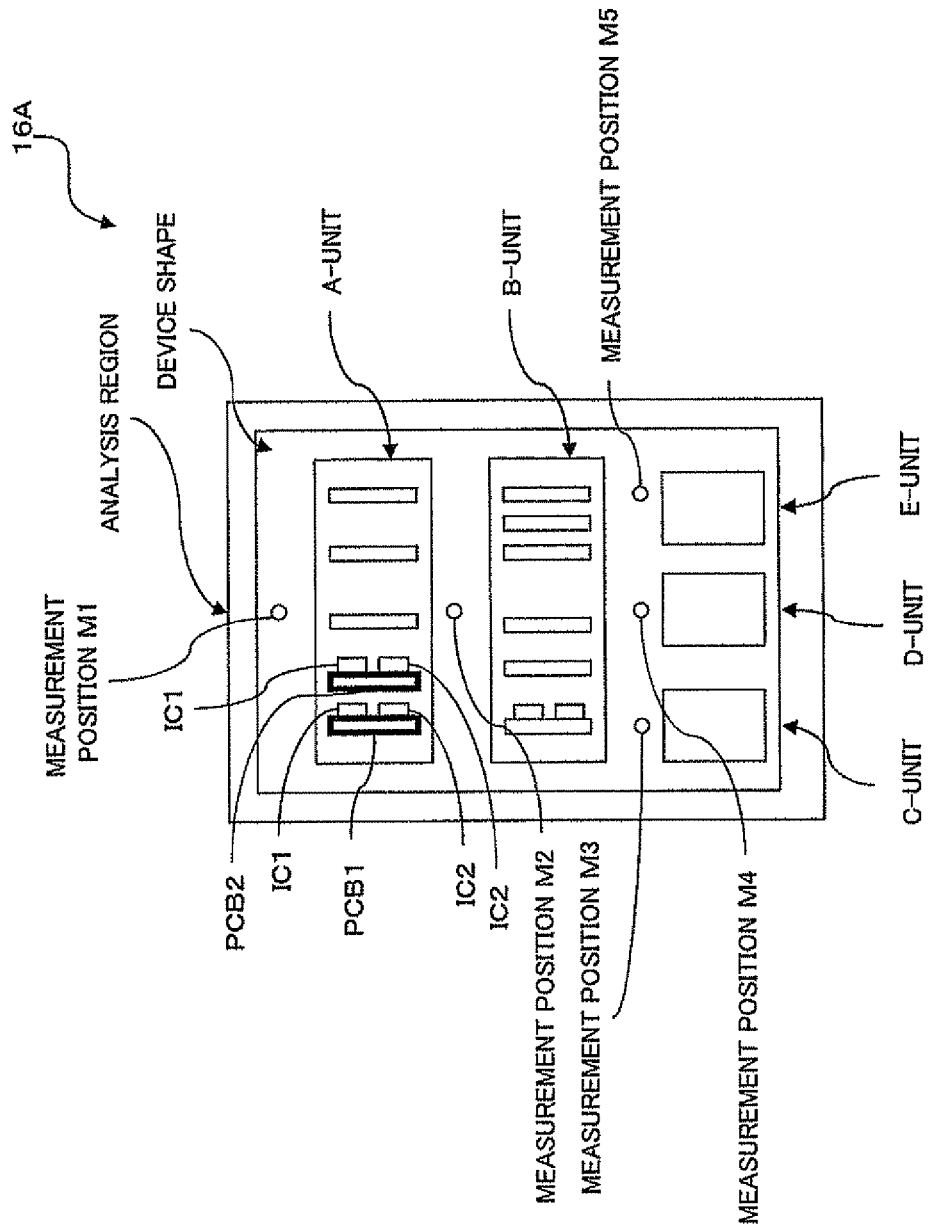
FIG. 7 is a diagram for illustrating a first practical example of a purpose-specific component group generator in the analysis support system according to the embodiment of this invention.
Figure 8:
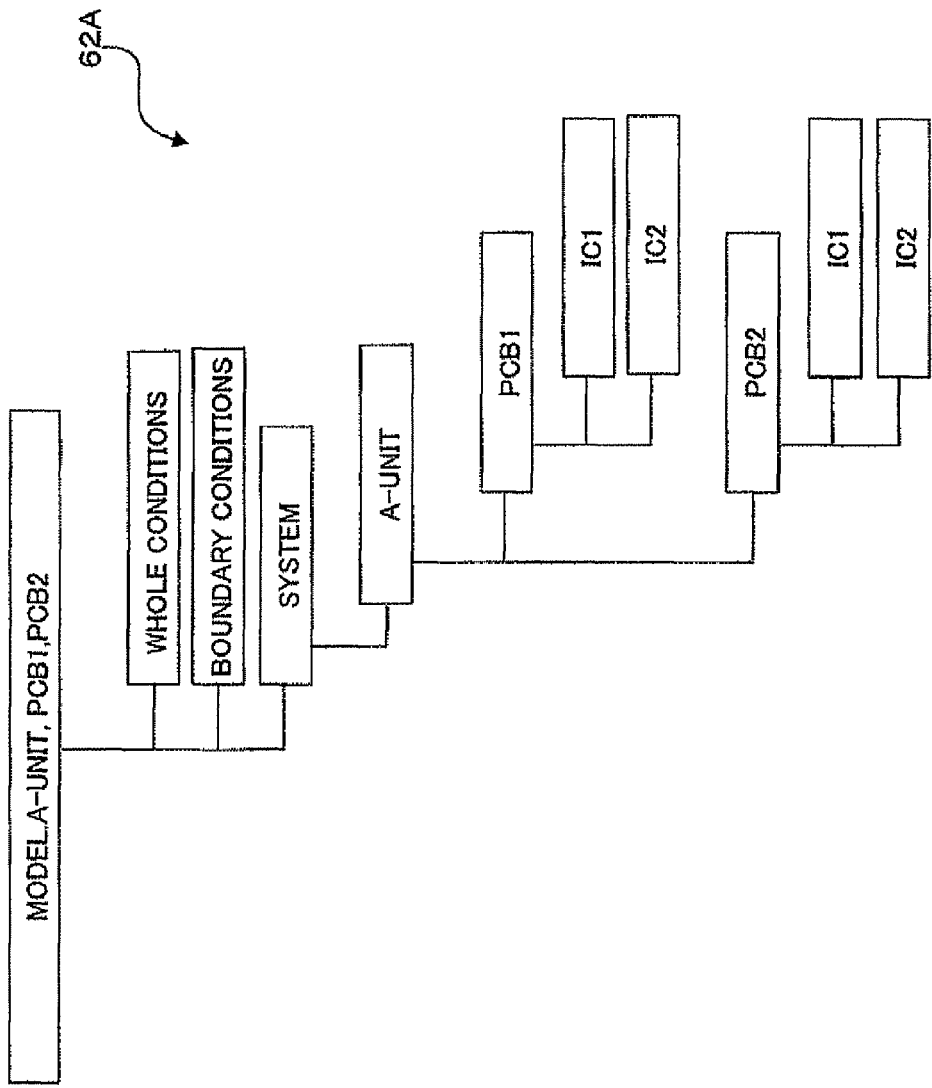
FIG. 8 is a diagram schematically showing, as the first practical example, a purpose-specific component group generated by the purpose-specific component group generator in the analysis support system according to the embodiment of this invention.

FIG. 7 is a diagram for illustrating a first practical example of the purpose-specific component group generator in the analysis support system according to the first embodiment of this invention. FIG. 8 is a diagram schematically showing a purpose-specific component group generated by the purpose-specific component group generator as the first practical example.

Hereinafter, description will be made of a case where the operator inputs an analysis purpose with the use of the analysis purpose input section 51a and designates a component name with the use of the component designator 51b to execute PCB ZOOM analysis on PCB1 and PCB2 arranged in A-UNIT configuring the electronic device 16A (refer to portions denoted by thick lines in FIG. 7).

The purpose-specific component group generator 55 extracts component names of components, which relate to PCB1 and PCB2 and relate to an analysis level corresponding to the inputted analysis purpose, from the hierarchical configuration information 29 shown in FIG. 5 to generate a purpose-specific component group 62a (refer to FIG. 8) formed by the extracted component names.

In the example shown in FIG. 8, the purpose-specific component group 62a has A-UNIT as a level immediately below SYSTEM, and PCB1 and PCB2 as a level immediately below A-Unit. Further, the purpose-specific component group 62a has IC and IC2 as a level immediately below each of PCB1 and PCB2.

When the analysis level is PCB ZOOM analysis as this, a purpose-specific component group 62a representing levels from PCB1 and PCB2 to IC1 and IC2 on a level below PCB1 and PCB2.

(B) Description of Second Practical Example

Figure 9:
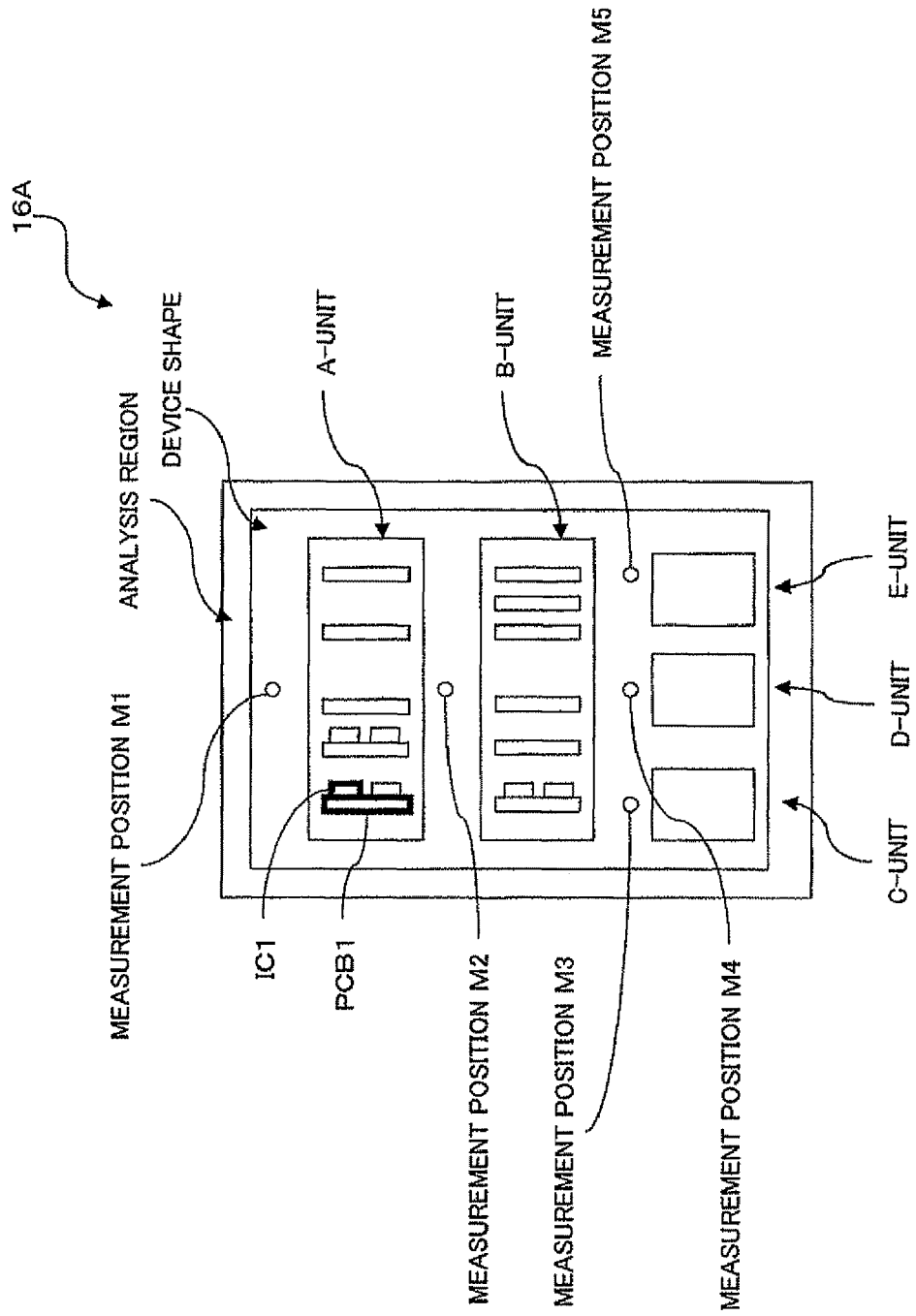
FIG. 9 is a diagram for illustrating a second practical example of the purpose-specific component group generator in the analysis support system according to the embodiment of this invention.
Figure 10:
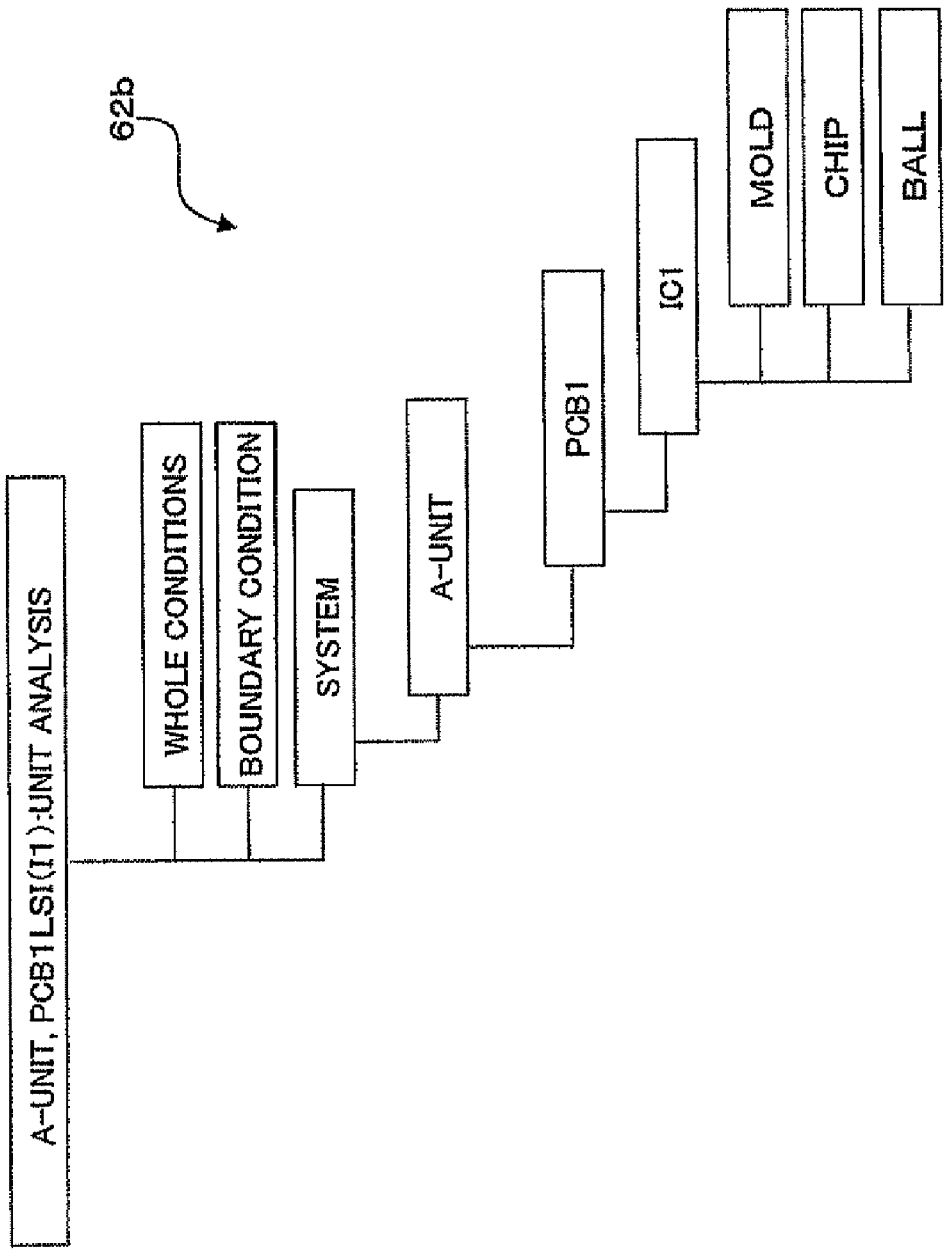
FIG. 10 is a diagram schematically showing, as the second practical example, a purpose-specific component group generated by the purpose-specific component group generator in the analysis support system according to the embodiment of this invention.

FIG. 9 is a diagram for illustrating a second practical example of the purpose-specific component group generator in the analysis support system according to the embodiment of this invention. FIG. 10 is a diagram schematically showing a purpose-specific component group generated by the purpose-specific component group generator as the second practical example.

Hereinafter, description will be made of a case where the operator inputs an analysis purpose with the use of the analysis purpose input section 51a and designates a component name as an analysis object with the use of the component designator 51b to execute LSI ZOOM analysis (unit analysis; LSI unit analysis) on PCB1 arranged in A-UNIT configuring the electronic device 16A and IC1 arranged in this PCB1 (refer to portions denoted by thick lines in FIG. 9)

The purpose-specific component group generator 55 extracts component names of components, which relate to IC1 and relate to an analysis level corresponding to the inputted analysis purpose, from the hierarchical configuration information 29 shown in FIG. 5 to generate a purpose-specific component group 62b (refer to FIG. 10) formed by the extracted component names.

In the example shown in FIG. 10, the purpose-specific component group 62b has A-UNIT as a level immediately below SYSTEM, and PCB1 as a level immediately below A-UNIT. Further, the purpose-specific component group 62b has IC1 as a level immediately below PCB1, and MOLD, CHIP and BALL as a level immediately below IC1.

When the analysis level is LSI ZOOM analysis as this, a purpose-specific component group 62b representing levels from IC1 to MOLD, CHIP and BALL lower in level than IC1 is generated.

Here, a practical procedure of generating a purpose-specific component group in the analysis support system 10 according to this embodiment will be described with reference to FIG. 6 according to a flowchart (B11 to B20) shown in FIG. 11.

Figure 11:
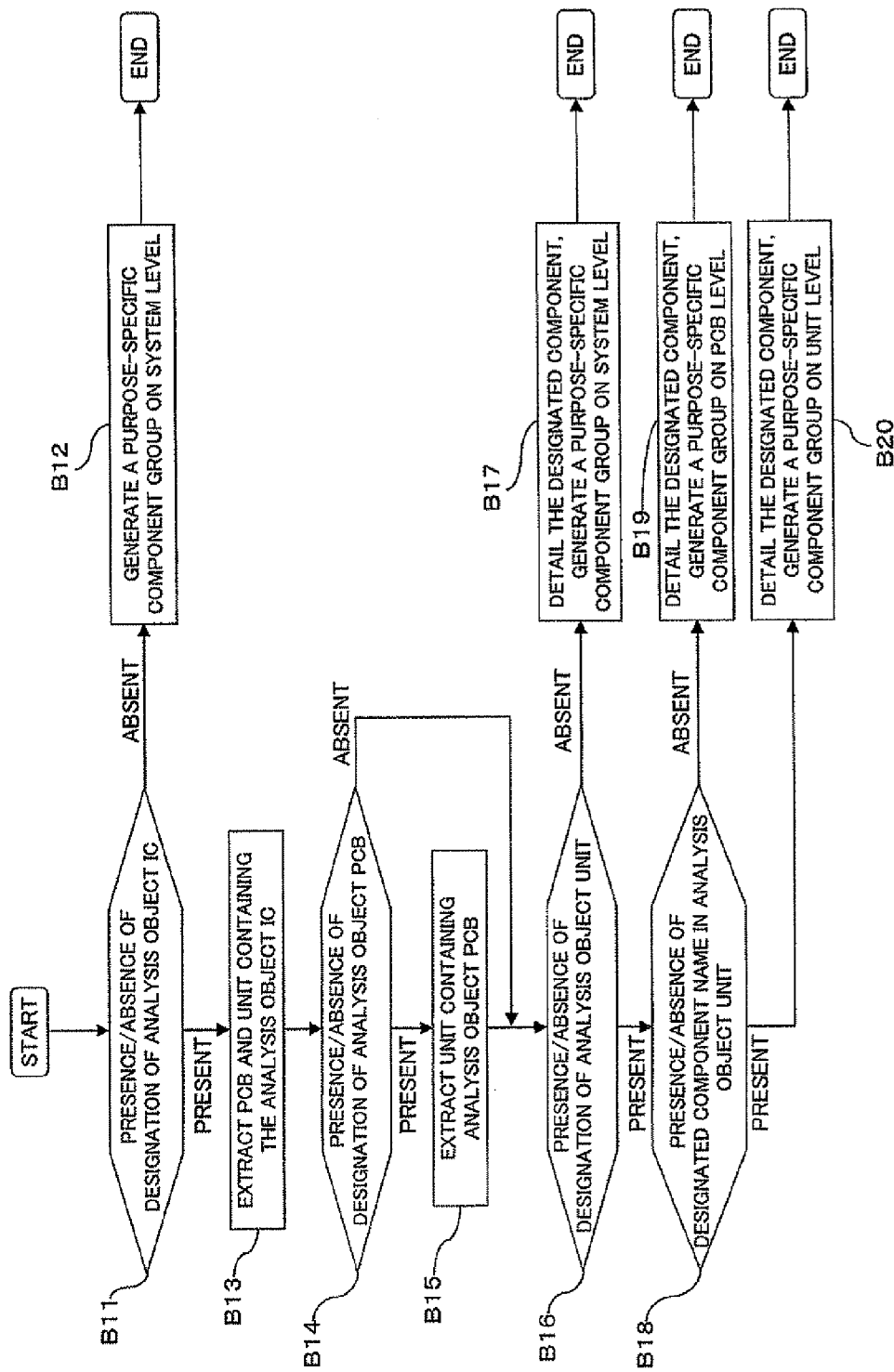
FIG. 11 is a flowchart for illustrating a practical means generating a purpose-specific component group in the analysis support system according to the embodiment of this invention.

An example shown in FIG. 11 is a case where a character string "JUNCTION TEMPERATURE ANALYSIS" is inputted from the analysis purpose input section 51a.

First, the operator inputs a character string "JUNCTION TEMPERATURE ANALYSIS" as an analysis purpose on the analysis purpose input screen 41a (refer to FIG. 6) displayed on the display section 41 with the use of the analysis purpose input section 51a, and designates a component name as an analysis object with the use of the component designator 51b if necessary.

The purpose-specific component group generator 55 determines whether or not designation of an analysis object IC is done by the component designator 51b (Step B11).

When it is determined as a result of the determination that designation of an analysis object IC is not done (refer to "ABSENT" route at Step B11), the analysis level designator 54 designates an analysis level "SYSTEM", and the purpose-specific component group generator 55 extracts component names on an analysis level "SYSTEM" from a model configuration information 291 without including (hereinafter referred to as "detailing", occasionally) component names on lower levels (without detailing), hierarchically combines the component names to generate a purpose-specific component group (Step B12), and terminates the process.

When designation of an analysis object IC is done (refer to "PRESENT" route at Step B11), the analysis level designator 54 and the purpose-specific component group generator 55 extract component names of PCB and UNIT containing a component name of the analysis object IC designated by the component designator 51b on their lower level (Step B13), then determine whether or not the component designator 51b designates an analysis object PCB (present or absent of designation) (Step B14). When the component designator 51b designates IC1, for example, "Model-All/System/A-Unit/PCB1", "Model-All/System/A-Unit/PCB2" and "Model-All/System/B-Unit/PCB1" including this IC1 on their lower level are extracted from the hierarchical configuration information 29 shown in FIG. 4.

When it is determined as a result of the determination that designation of an analysis object PCB is done (refer to "PRESENT" route at Step B14), the purpose-specific component group generator 55 extracts a component name of UNIT including a component name of the analysis object PCB designated by the component designator 51b on its lower level (Step B15). When PCB1 is designated by the component designator 51b, for example, "Model-All/System/A-Unit" and "Model-All/System/B-Unit" including this PCB1 on their lower level are extracted from the hierarchical configuration information 29 shown in FIG. 4.

The analysis level designator 54 and the purpose-specific component group generator 55 determine whether or not designation of an analysis object UNIT is done by the component designator 51b (presence or absence of designation) (Step B16).

When designation of an analysis object PCS is not done (refer to "ABSENT" route at Step B14), the procedure proceeds to Step B16.

When designation of an analysis object UNIT is not done as a result of the determination (refer to "ABSENT" route at Step 16), the analysis level designator 54 designates an analysis level "SYSTEM", extracts a component name corresponding to the analysis level "SYSTEM" designated by the analysis level designator 54 from the model configuration information 291. The purpose-specific component group generator 55 hierarchically combines this component name with component names of an analysis object IC and an analysis object PCB designated by the component designator 51b to generate a purpose-specific component group (Step B17), and terminate the process.

When designation of an analysis object UNIT is done (refer to "PRESENT" at Step B16), the purpose-specific component group generator 55 determines presence or absence of a component name of an analysis object UNIT designated by the component designator 51b on the basis of the hierarchical configuration information 29 (Step B18).

When a component name of the analysis object UNIT designated by the component designator 51b is absent as a result of the determination (refer to "ABSENT" at Step B18), the analysis level designator 54 designates an analysis level "PCB ZOOM", extracts a component name corresponding to the analysis level "PCB ZOOM" designated by the analysis level designator 54 from the model configuration information 291. The purpose-specific component group generator 55 hierarchically combines this component name with component names of an analysis object IC and an analysis object PCB designated by the component designator 51b to generate a purpose-specific component group (Step B19), and terminates the process.

When the component designator 51b designates a component name of the analysis object UNIT (refer to "PRESENT" route at Step B18), the analysis level designator 54 designates an analysis level "UNIT ZOOM", extracts a component name corresponding to the analysis level "UNIT ZOOM" designated by the analysis level designator 54 from the model configuration information 291. The purpose-specific component group generator 55 hierarchically combines this component name with component names of an analysis object UNIT, an analysis object IC and an analysis object PCB designated by the component designator 51b to generate a purpose-specific component group (Step B20). When A-UNIT is designated by the component designator 51*b*, for example, "Model-All/System/A-Unit" is extracted from the hierarchical configuration information 29 shown in FIG. 4, and the procedure is terminated.

Accordingly, when a component name is designated by the component designator 51*b*, the analysis level designator 54 designates an analysis level on the basis of an analysis purpose inputted from the analysis purpose input section 51*a* and a component name designated by the component designator 51*b*. The purpose-specific component group generator 55 generates a purpose-specific component group (refer to 62*a* in FIG. 8, 62*b* in FIG. 10 and so forth) on the basis of the analysis level designated by the analysis level designator 54, a detail level recorded in the configuration information record section 21, the hierarchical configuration information 29 recorded in the hierarchical configuration record section 19 and a component name designated by the component name designator 51*b*.

Figure 12:
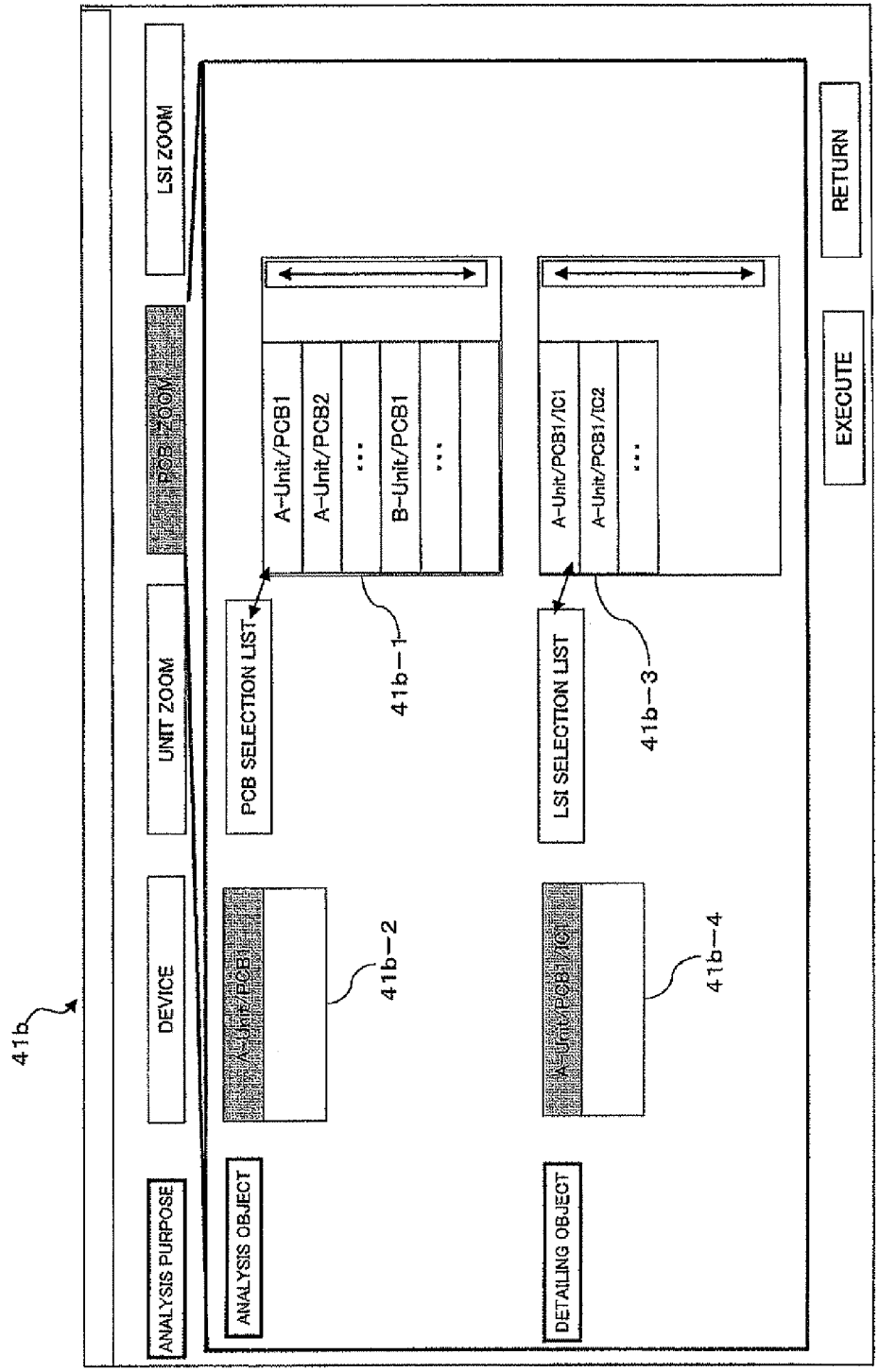
FIG. 12 is a diagram for illustrating a component selection screen in the analysis support system according to the embodiment of this invention.

FIG. 12 is a diagram for illustrating the component selection screen in the analysis support system according to the embodiment of this invention.

The component selection list generator 56 generates (makes) a list of components forming a purpose-specific component group generated by the purpose-specific component group generator 55. As shown in FIG. 12, for example, the component selection list generator 56 generates an analysis object selection list 41*b*-1, an analysis object item 41*b*-2, a detailing object selection list 41*b*-3 and a detailing object item 41*b*-4 on the basis of the purpose-specific component group generated by the purpose-specific component group generator 55, and displays them on the component selection screen 41*b*.

The component selector 52 selects an arbitrary component name from among component names corresponding to analytic components configuring a purpose-specific analysis model. For instance, the component selector 52 can select an arbitrary component name from among component names displayed as the analysis object selection list 41*b*-1 and the detailing object selection list 41*b*-3 on the component selection screen 41*b* shown in FIG. 12.

The analysis object selection list 41*b*-1 displays component names corresponding to an analysis level designated by the analysis level designator 54 among component names configuring a purpose-specific component group generated by the purpose-specific component group generator 55, as a list, on the component selection screen 41*b*. As shown in FIG. 12, for example, when an analysis level designated by the analysis level designator 54 is "PCB ZOOM", a list showing component names such as "A-Unit/PCB1", "A Unit/PCB2", "B-Unit/PCB1" and so forth as the analysis object selection list 41*b*-1 on the component selection screen 41*b*.

The analysis object item 41*b*-2 displays, on the component selection screen 41*b*, a component name selected by the component selector 52 from among component names displayed on the analysis object selection list 41*b*-1. When "A-Unit/PCB1" is selected from the analysis object selection list 41*b*-1 by the component selector 52 as shown in FIG. 12, for example, the analysis object item 41*b*-2 displays "A-Unit/PCB1" as the analysis object item 41*b*-2 on the component selection screen 41*b*.

The detailing object selection list 41*b*-3 displays component names lower in level than a component name displayed in the analysis object item 41*b*-2 as a list on the component selection screen 41*b*, When "A-Unit/PCB1" is displayed as the analysis object item 41*b*-2 as shown in FIG. 12, for example, a list showing component names such as "A-Unit/PCB1/IC1", "A-Unit/PCB1/IC2" and so forth is displayed as the detailing object selection list 41*b*-3 on the component selection screen 41*b*.

The detailing object item 41*b*-4 displays a component name selected by the component selector 52 from among component names displayed on the detailing object selection list 41*b*-3. When "A-Unit/PCB1/IC1" is selected by the component selector 52 from the detailing object selection list 41*b*-3 as shown in FIG. 12, for example, "A-Unit/PCB1/IC1" is displayed as the detailing object item 41*b*-4 on the component selection screen 41*b*.

When the operator selects arbitrary component names (hereinafter expressed as "selecting an extraction condition", occasionally) from among component names displayed on the analysis object selection list 41*b*-1 and the detailing object selection list 41*b*-3 with the use of the component selector 52, the purpose-specific component group generator 55 generates a purpose-specific component group from the model configuration information 291 on the basis of an analysis level designated by the analysis level designator 54, a detail level recorded in the configuration information record section 21 and a component name (configuration information relating to an analytic component) selected by the component selector 52.

In concrete, the purpose-specific component group generator 55 extracts a component name corresponding to an analysis level designated by the analysis level designator 54 from the hierarchical configuration information 29 recorded by the hierarchical configuration information record section 19 and a component name specified by a detail level added to this component name from the model configuration information 291, and generates a purpose-specific component group formed by these extracted component names. Thereafter, the purpose-specific component group generator 55 extracts component names selected by the component selector 52 to again generate (re-generate) a purpose-specific component group.

Figure 13:
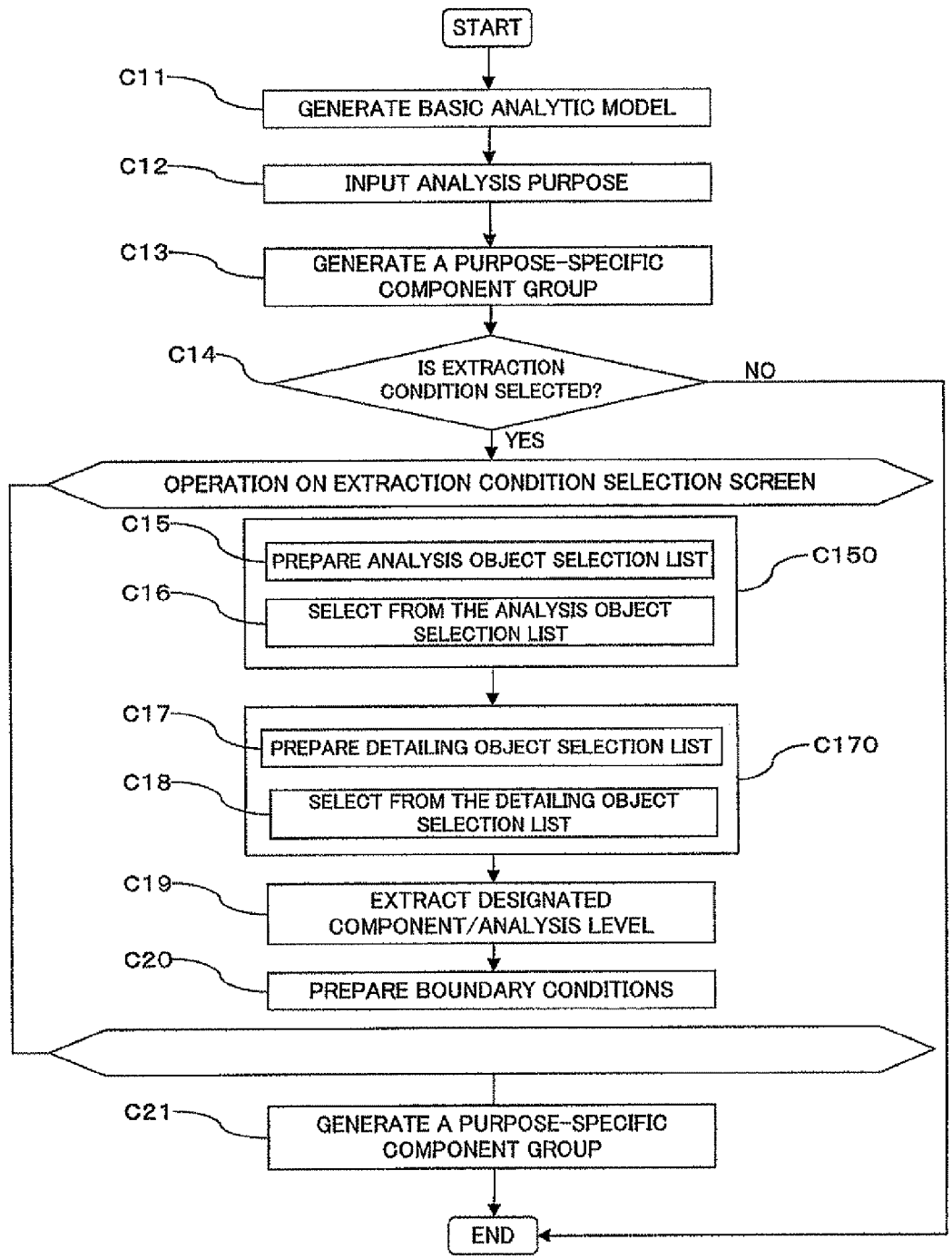
FIG. 13 is a flowchart showing a procedure from analysis purpose input to purpose-specific component group generation in the analysis support system according to the embodiment of this invention.

A procedure from inputting of an analysis purpose to generation of a purpose-specific component group in the analysis support system 10 configured as above will be described with reference to a flowchart (Steps C11 to C21) shown in FIG. 13.

A person exclusively appointed for analysis who has knowledge about thermal analysis generates a basic analytic model on the basis of design data, generates the hierarchical configuration information 29 on the basis of the basic analytic model, generates the model configuration information 291 by adding the attribute information 15 to each of components forming the hierarchical configuration information 29, and records them in the first storage 11 (the hierarchical configuration information record section 19, the analysis level record section 20 and the configuration information record section 21) (Step C11).

An operator such as a designer or the like who does not have detailed knowledge about thermal analysis inputs an analysis purpose with the use of the analysis purpose input section 51*a* on the analysis purpose input screen 41*a* displayed on the display section 41 (Step C12), and designates a component name with the use of the component designator 51*b* when necessary.

When an analysis purpose is inputted from the analysis purpose input section 51*a*, the analysis level designator 54 designates an analysis level corresponding to the analysis purpose inputted from the analysis purpose input section 51*a*. The purpose-specific component group generator 55 extracts a component name corresponding to the analysis level designated by the analysis level designator 54 and a component name specified by a detail level corresponding to the analysis level designated by the analysis level designator 54 from the model configuration information 291 to generate a purpose-specific component group (Step C13).

When a component name is designated by the component designator 51b, the analysis level designator 54 designates an analysis level on the basis of the analysis purpose inputted from the analysis purpose input section 51a and the component name designated by the component designator 51b. The purpose-specific component group generator 55 generates a purpose-specific component group on the basis of the analysis level designated by the analysis level designator 54, a detail level recorded in the configuration information record section 21, the hierarchical configuration information 29 recorded in the hierarchical configuration information record section 19 and the component name designated by the component designator 51b.

Here, it is determined whether an extraction condition is selected for the purpose-specific component group generated by the purpose-specific component group generator 55 (Step C14).

When an extraction condition is selected (refer to "YES" route at Step C14), the operator selects an arbitrary component name with the use of the component selector 52 on the component selection screen 41b (Steps C15 to C20).

When an extraction condition is selected, the analysis object selection list 41b-1 is generated, and a selection process is performed on this analysis object selection list 41b-1 (Step C150). Namely, the component selection list generator 56 displays the analysis object selection list 41b-1 on the component selection screen 41b (Step C15). The operator selects an arbitrary component name from among component names displayed on the analysis object selection list 41b-1 with the use of the component selector 52 (Step C16).

When a component name displayed on the analysis object selection list 41b-1 is selected through the component selector 52, the detailing object selection list 41b-3 is generated, and a selection process is performed on the detailing object selection list 41b-3 (Step C170). Namely, the component selection list generator 56 displays the detailing object selection list 41b-3 on the component selection screen 41b (step C17), and the operator selects an arbitrary component name from among component names displayed on the detailing object selection list 41b-3 with the use of the component selector 52 (Step C18).

The analysis level designator 54 and the purpose-specific component group generator 55 extract a designated component and a designated analysis level (Step C19), and the operator inputs boundary conditions (a change in environmental temperature, changes in wind amount, wind velocity and so forth) through the input section 42 (Step C20). Then, the purpose-specific component group generator 55 extracts component names selected by the component selector 52 to generate a purpose-specific component group (Step C21), and the process is terminated.

When an extraction condition is not selected (refer to "NO" route at Step C14), the process is terminated. As this, a purpose-specific component group is generated.

The analytic model generator 57 generates a purpose-specific analytic model (not shown) to be used for analysis according to an analysis purpose. The analytic model generator 57 generates a purpose-specific analytic model on the basis of a basic analytic model having analytic components corresponding to respective components configuring the electronic device 12 and a purpose-specific component group generated by the purpose-specific component group generator 55.

The analytic model generator 57 extracts components corresponding to component names from the basic analytic model on the basis of component names forming a purpose-specific component group, for example, and hierarchically combines the extracted components to generate a purpose-specific analytic model.

As the analytic model generator 57, employable is any one of various known techniques that can generate a purpose-specific analytic model on the basis of a basic analytic model and a purpose-specific component group.

Figure 14:
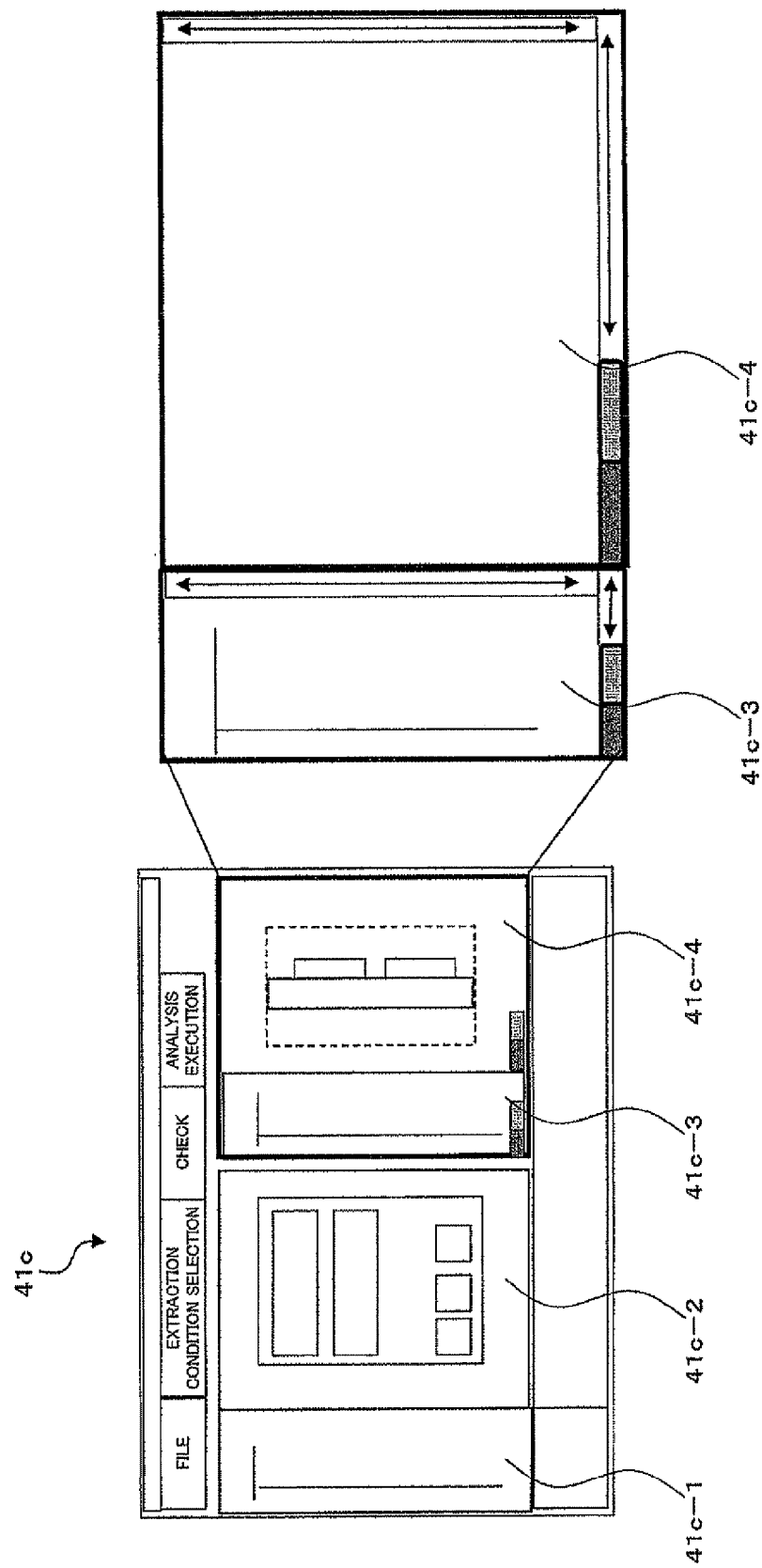
FIG. 14 is a diagram for illustrating an analytic model display screen in the analysis support system according to the embodiment of this invention.

The analytic model generator 57 displays information about a generated purpose-specific analytic model on an analytic model display screen 41c shown in FIG. 14. Incidentally, a purpose-specific analytic model generated by the analytic model generator 57 is temporarily stored in, for example, the DAM 46 or the like, not stored in the HDD 45 or the like.

Figure 15:
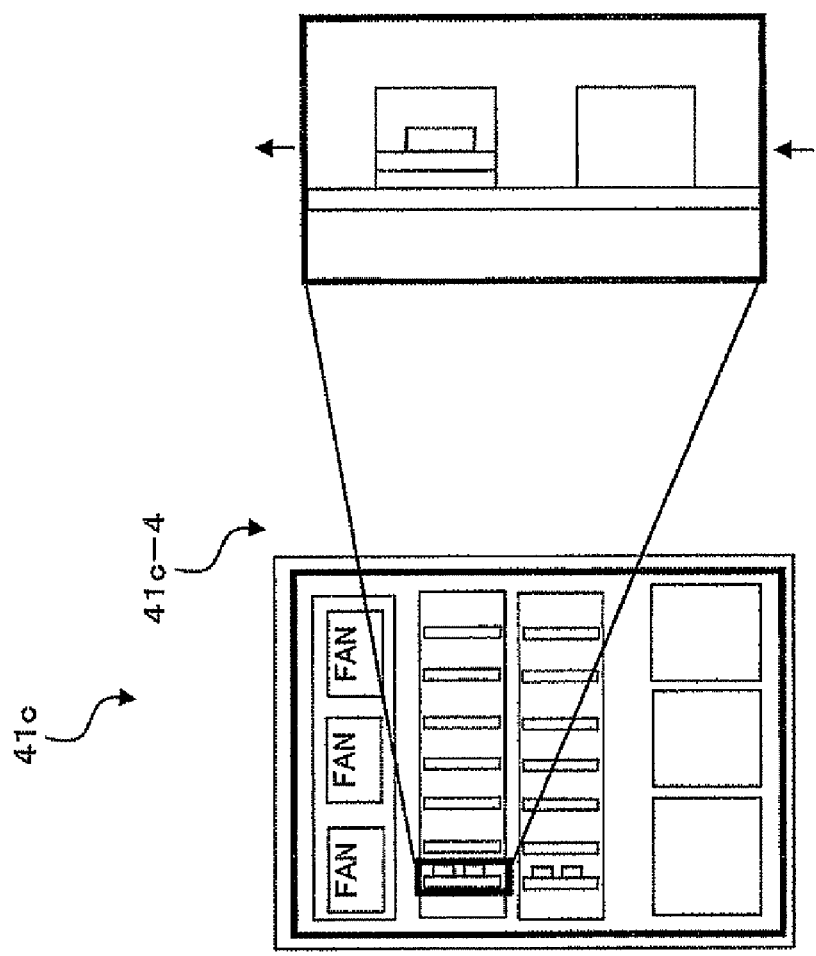
FIG. 15 is a diagram for illustrating an analytic model display screen in the analysis support system according to the embodiment of this invention.

FIGS. 14 and 15 are diagrams for illustrating an analytic model display screen in the analysis support system according to the embodiment of this invention.

The analytic model display screen 41c is to display the hierarchical configuration information 29, a schematic view of a basic analytic model, a purpose-specific component group and a schematic view of a purpose-specific analytic model. In an example shown in FIG. 14, the analytic model display screen 41c is divided into four in the horizontal direction of the screen (horizontal direction on the paper of FIG. 14) to form a first display region 41c-1, a second display region 41c-2, a third display region 41c-3 and a fourth display region 41c-4.

The first display region 41c-1 is used to display the hierarchical configuration information 29 recorded in the hierarchical configuration information record section 19. The second display region 41c-2 is used to display a schematic view of a basic analytic model. In the second display region 41c-2, schematically displayed are external appearances of analytic components corresponding to components designated by the hierarchical configuration information 29.

The third display region 41c-3 is used to display a purpose-specific component group 62 generated by the purpose-specific component group generator 55, showing a list of component names configuring the purpose-specific component group 62 in a tree-like form (hierarchically).

The fourth display region 41c-4 is used to display a schematic view of a purpose-specific analytic model generated by the analytic model generator 57 as shown in FIG. 15, where external views of components are combined. In the fourth display region 41c-4, analytic components corresponding to components designated by the hierarchical configuration information 29 are schematically displayed.

In the fourth display region 41c-4 and the second display region 41c-2, the wind direction which is one of the whole conditions is denoted by an arrow, for example (refer to an arrow "↑" If in FIG. 15).

When a plurality of purpose-specific analytic models are generated, a plurality of screens displaying the respective purpose-specific analytic models are formed with tabs on the analytic model display screen 41c, for example, whereby the purpose-specific analytic models can be switched within one window by selectively switching the tabs.

The edition analytic model generator 58 generates an edited analytic model according to an edition condition inputted through the edition condition input section 53 from a purpose-specific analytic model generated by the analytic model generator 57.

The edition condition input section 53 enables the operator to input edition conditions for components (analytic components) configuring a purpose-specific analytic model generated by the analytic model generator 57 within a range limited by the edition limitation information. For instance, the operator inputs edition conditions (replace, delete, move) with the use of the edition condition input section 53 while referring to the analytic model display screen 41c shown in FIG. 14.

Hereinafter, generation of an edited analytic model will be described, with reference to a third practical example shown in FIGS. 16 and 17, where the electronic device 16A shown in FIG. 3 is used.

(C) Third Practical Example

Figure 16:
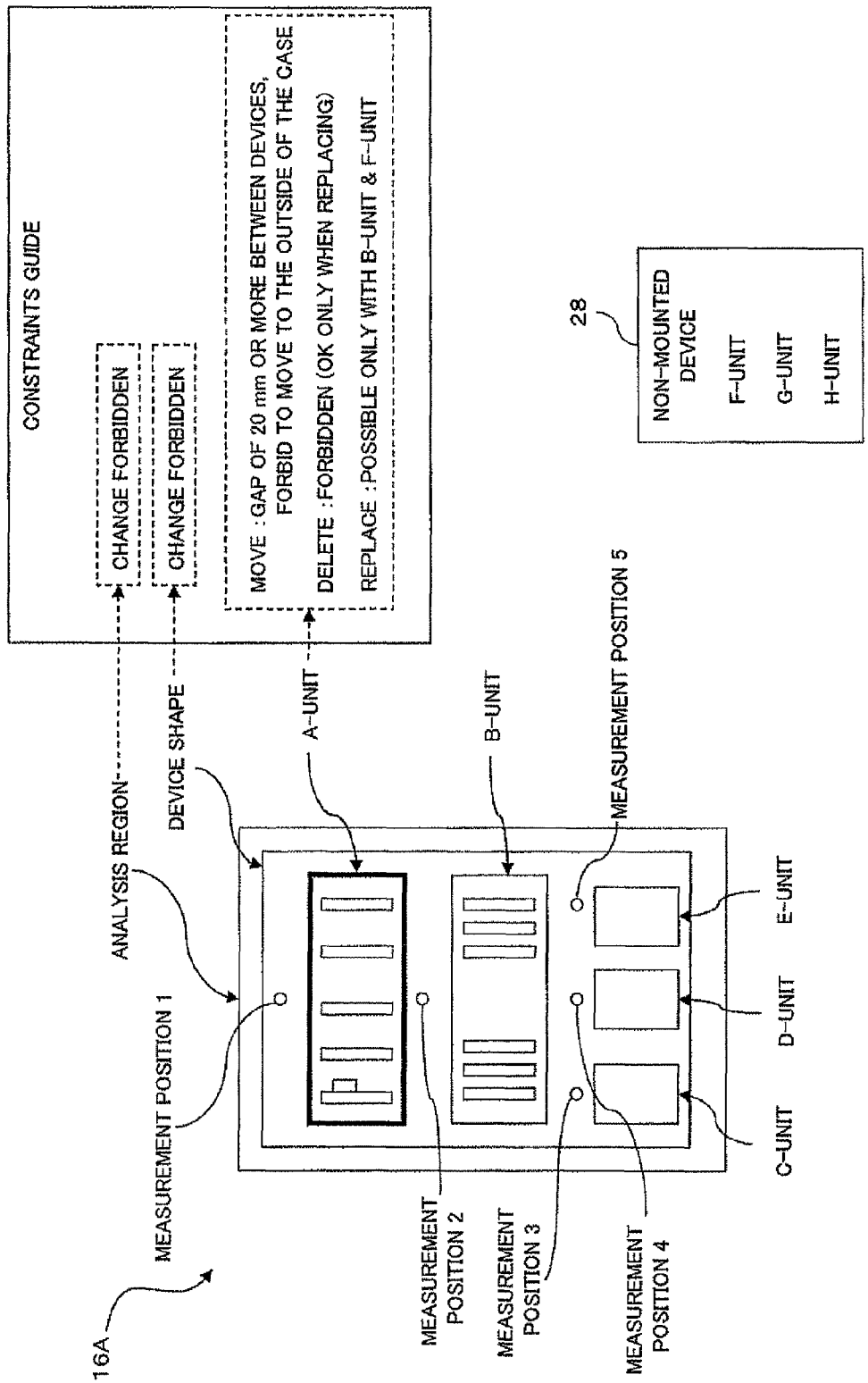
FIG. 16 is a diagram for illustrating a function of an edited analytic model generator in the analysis support system according to the embodiment of this invention.
Figure 17:
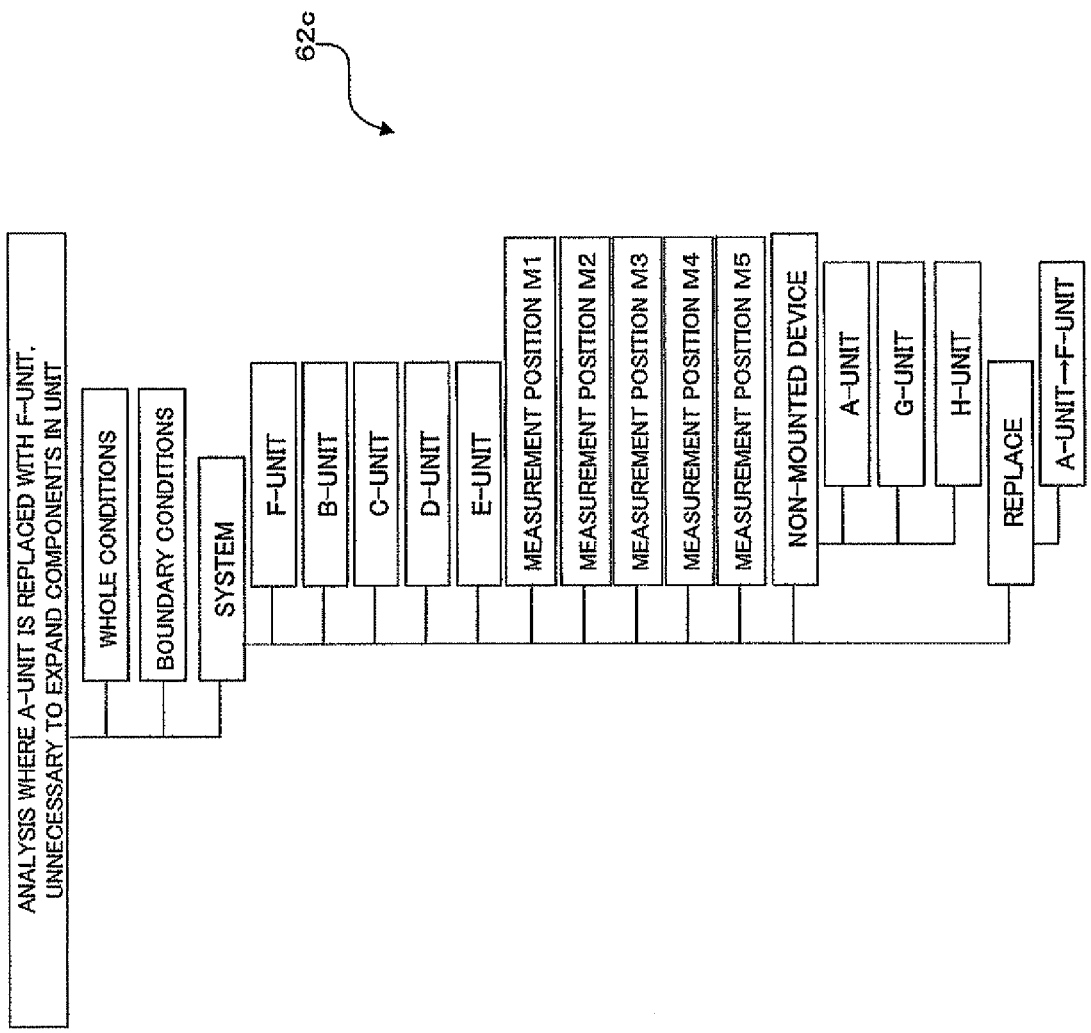
FIG. 17 is a diagram schematically showing a purpose-specific component group as a third practical example generated by the edition analytic model generator in the analysis support system according to the embodiment of this invention.

FIG. 16 is a diagram for illustrating a third practical example of the purpose-specific component group generator in the analysis support system according to the embodiment of this invention. FIG. 17 is a diagram schematically showing a purpose-specific component group as the third practical example generated by the purpose-specific component group generator.

The edited analytic model generator 58 displays a constraints guide (edition limitation conditions; edition conditions) on the display section 41 as shown in FIG. 16.

As edition items relating to movement of A-UNIT, the constraints guide requires a gap of 20 mm or more between A-UNIT and other device, forbids to move A-UNIT to the outside of the case, forbids to delete A-UNIT as an edition item relating to deletion of A-UNIT, and permits deletion of A-UNIT only when A-UNIT is replaced. As an edition item relating to replacement of A-UNIT, the constraints guide represents that A-UNIT is permitted to be replaced with only either B-UNIT or F-UNIT. The constraints guide also forbids a change in the analysis region and device shape.

When the operator replaces A-UNIT with F-UNIT by inputting an edition condition with the use of the edition condition input section 53 according to the constraints guide (refer to a portion denoted by a thick line in FIG. 16), the edited analytic model generator 58 generates an edited analytic model in which A-UNIT has been replaced with F-UNIT from the purpose-specific analytic model generated by the analytic model generator 57. The purpose-specific component group generator 55 generates a purpose-specific component group 62c in which a component name "A-UNIT" has been replaced with a component name "F-UNIT" (refer to FIG. 17).

In the example shown in FIG. 17, the purpose-specific component group 62c has, on a level immediately below System, F-UNIT, B-UNIT, C-UNIT, D-UNIT, E-UNIT, a measurement position M1, a measurement position M2, a measurement position M3, a measurement position M4 and a measurement position M5 along with information about non-mounted devices and replacement (information representing that replacement has been performed). On a level immediately below the non-mounted devices, the purpose-specific component group 62c has A-UNIT, G-UNIT and H-UNIT, which represents that A-UNIT, G-UNIT and H-UNIT are non-mounted devices. On a level immediately below "replacement", the purpose-specific component group 62c has information representing that A-UNIT has been replaced with F-UNIT.

As above, the purpose-specific component group 62c representing that A-UNIT has been replaced with F-UNIT is generated.

The difference information generator 59 generates difference information representing a difference between a purpose-specific analytic model (analytic model before extraction) generated by the analytic model generator 57 and an edited analytic model (analytic model after extraction) generated by the edited analytic model generator 58.

Figure 23:
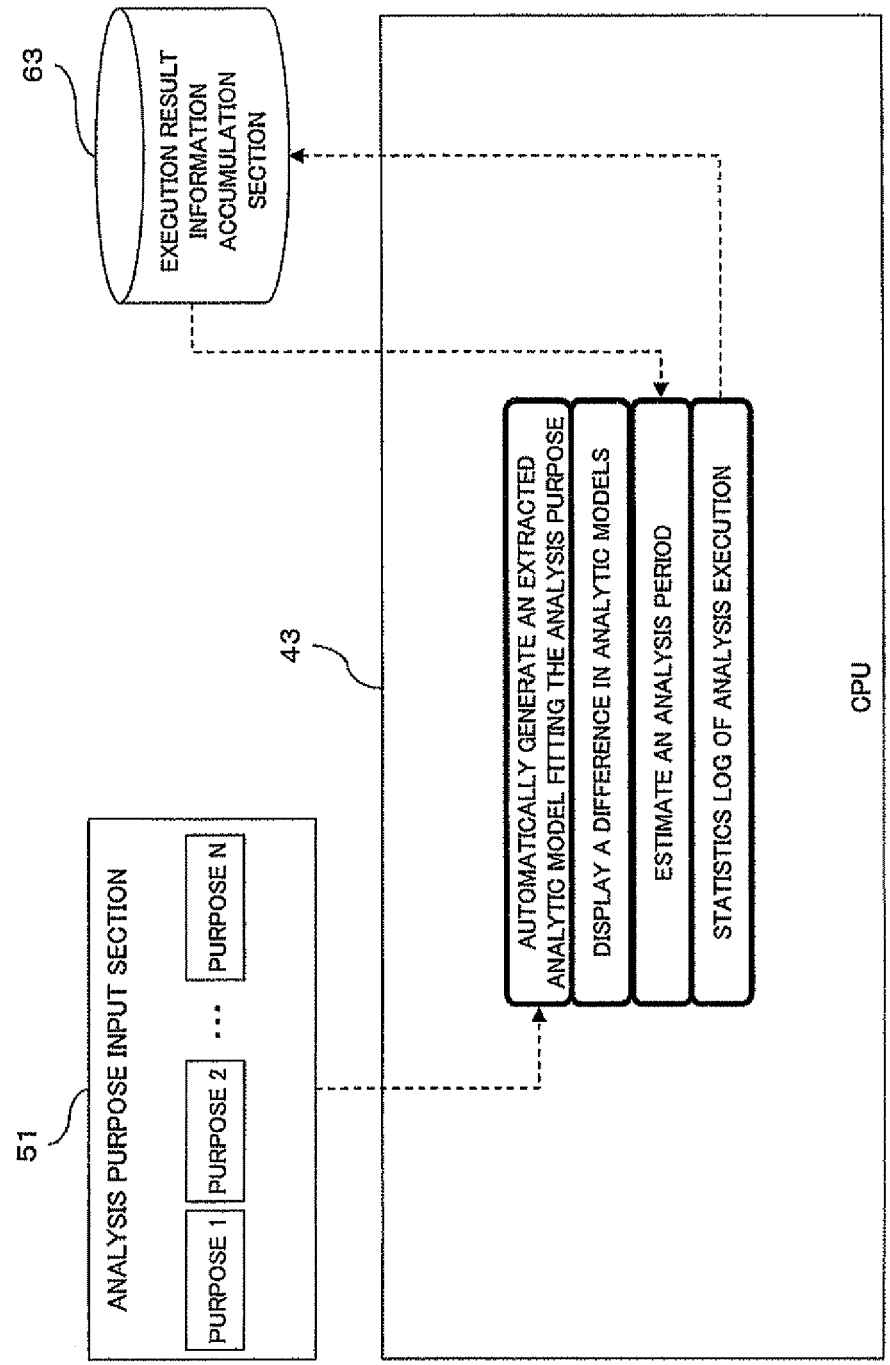
FIG. 23 is a diagram for illustrating functions of the analysis support system according to the embodiment of this invention.

The difference information generator 59 displays the generated difference information as difference display screens 41d-1 and 41d-2 on the display section 41 (refer to "DISPLAY A DIFFERENCE IN ANALYTIC MODELS" in FIG. 23).

Figure 18:
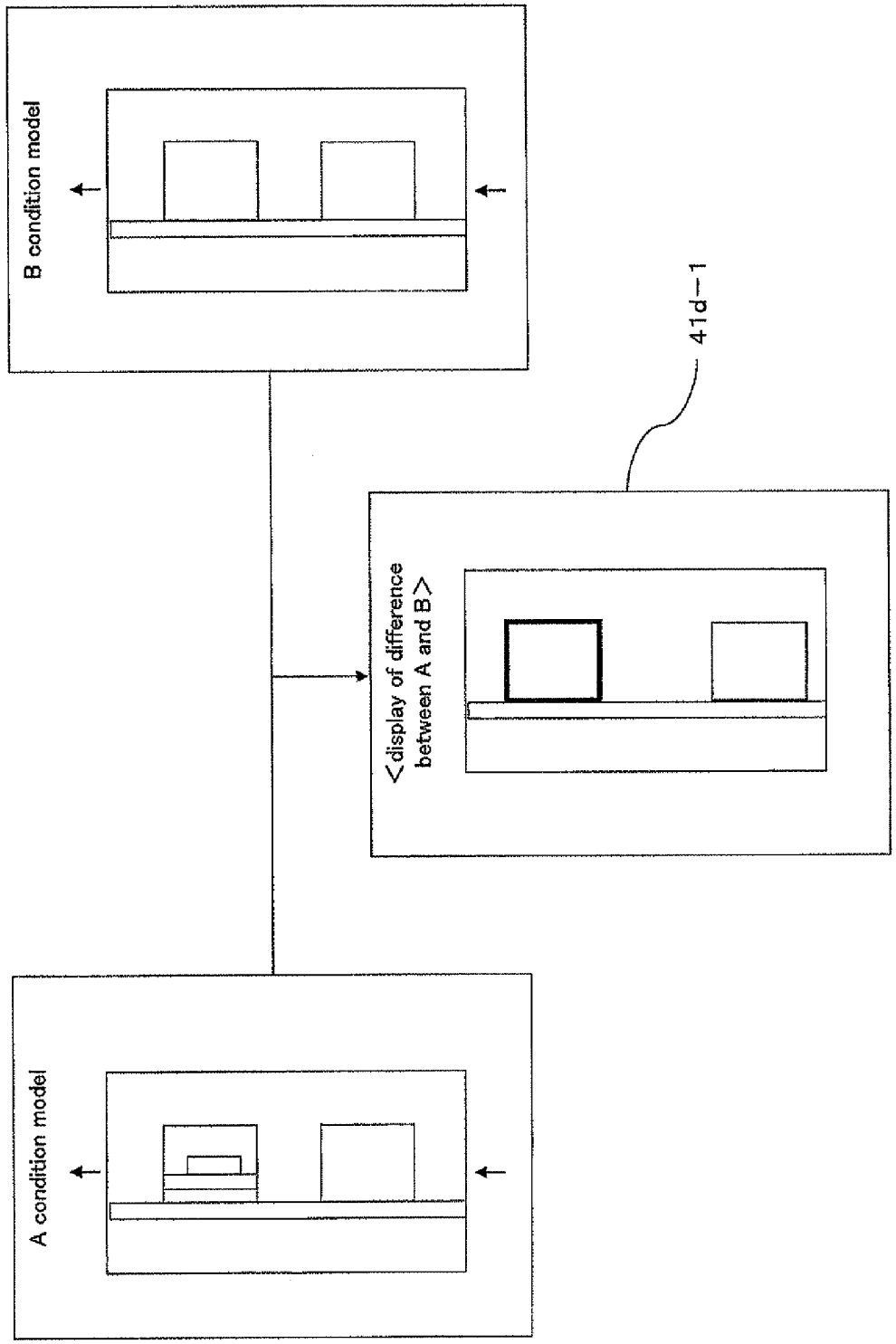
FIG. 18 is a diagram for illustrating a function of a difference information generator in the analysis support system according to the embodiment of this invention.
Figure 19:
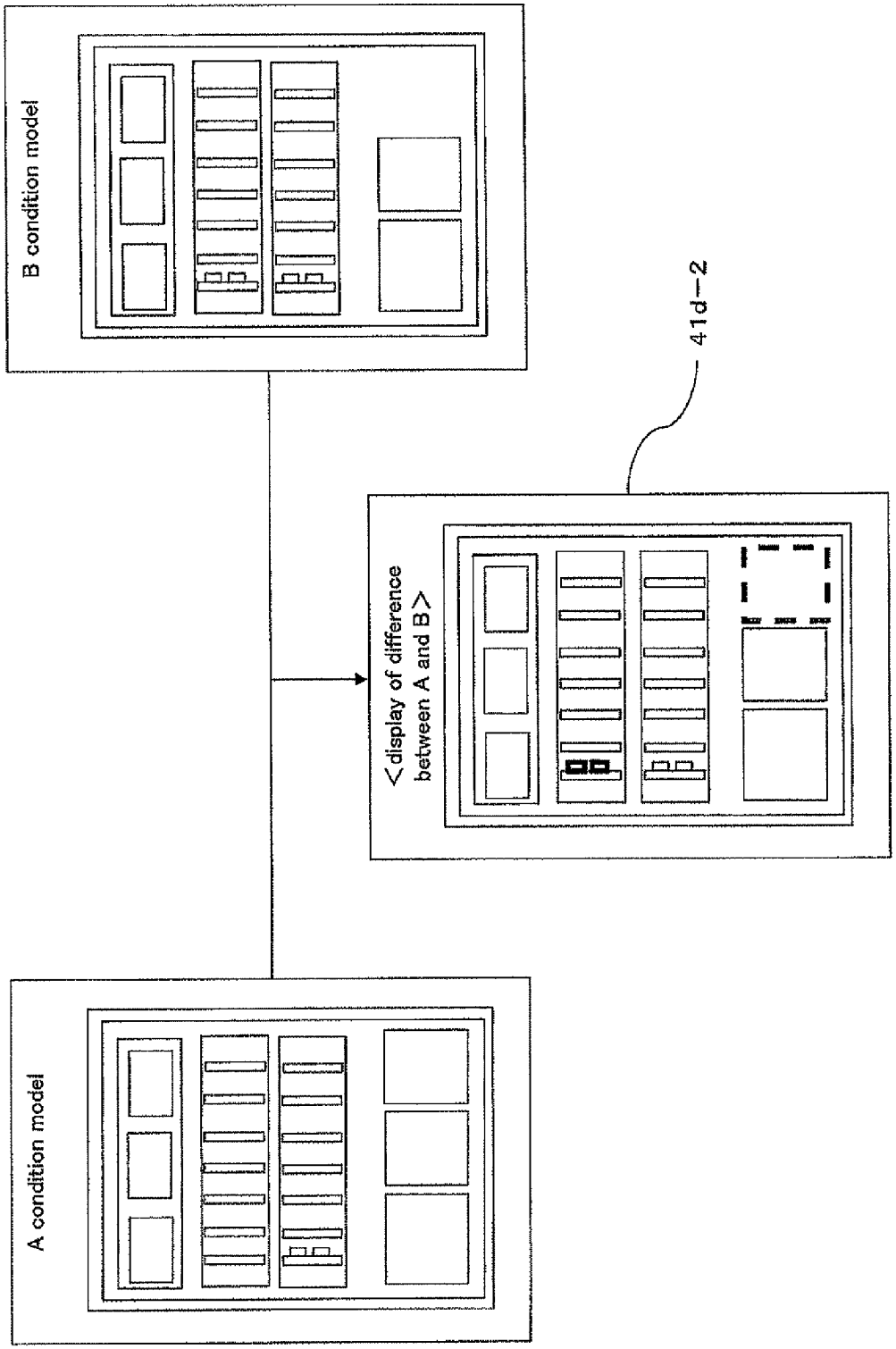
FIG. 19 is a diagram for illustrating the function of the difference information generator in the analysis support system according to the embodiment of this invention.

FIGS. 18 and 19 are diagrams for illustrating a function of the difference information generator in the analysis support system according to the embodiment of this invention.

In FIG. 18 showing an example of display, when a purpose-specific analytic model (A condition model in FIG. 18) that shows a detailed IC1 arranged on PCB is edited to an edition analytic model (B condition model in FIG. 18) that does not show (not detail) the interior of IC1, the difference information generator 59 displays a difference between the A condition model and the B condition model, that is, difference information not displaying the interior of IC1 but denoting IC1 by a thick line, which is generated as information relating to IC1 and the internal configuration of this IC1, on the difference display screen 41d-1 on the display section 41 (display of a difference between A and B in FIG. 18). Incidentally, an arrow "↑" in FIG. 18 shows a wind direction.

In FIG. 19 showing another example of display, when a purpose-specific analytic model (A condition model in FIG. 19) that shows Z-UNIT but does not show ICs on PCB1 arranged on A-UNIT is edited into an edited analytic model (B condition model in FIG. 19) that does not show Z-UNIT but shows IC1 and IC2 on PCB 1 arranged on A-UNIT, the difference information generator 59 displays a difference between the A condition model and the B condition model, that is, difference information displaying IC1 and IC2 on PCB1 with thick lines and Z-UNIT with a thick broken line, which is generated as information relating to Z-UNIT and IC1 and IC2 on PCB1, on the difference display screen 41d-2 on the display section 41 (display of a difference between A and B in FIG. 19).

As a method of displaying difference information, the present invention is not limited to the above examples, but any one of various known techniques is employable.

The analysis processor 60 executes analysis on a purpose-specific analytic model generated by the analytic model generator 57. The analysis processor 60 also executes analysis on an edited analytic model generated by the edited analytic model generator 58.

Note that this analysis execution process can be carried out in various known methods.

After executing analysis on the purpose-specific analytic model, the analysis processor 60 accumulates a result of the execution in an execution result information accumulation section (analysis statistics database; statistics DB) 63.

The second storage 14 stores various kinds of information, having the execution result information accumulation section 63 as shown in FIG. 1. The second storage 14 is realized with an HDD in a computer connected to LAN or an HDD directly connected to LAN, for example. Note that the second storage 14 is not limited to an HDD, but can be any one of various known storages.

Figure 21:
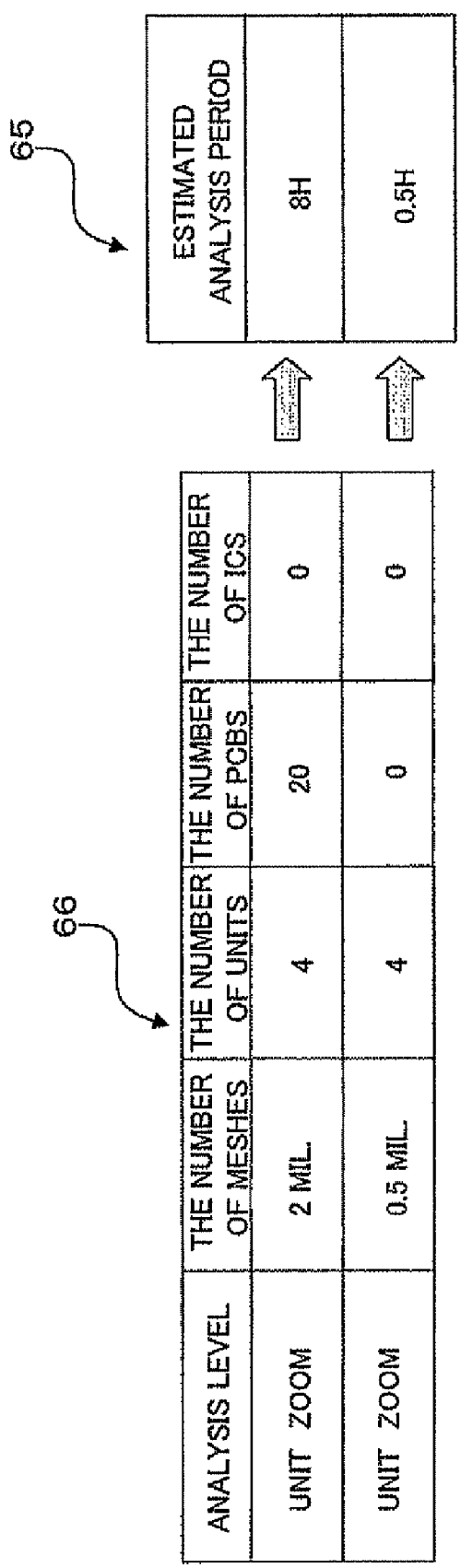
FIG. 21 is a diagram for illustrating a function of an analysis execution period estimator in the analysis support system according to the embodiment of this invention.

FIG. 20 is a diagram for illustrating execution result information in the analysis support system according to the embodiment of this invention. FIG. 21 is a diagram for illustrating a function of the analysis execution period estimator of the analysis support system.

The execution result information accumulation section 63 accumulates execution result information 64 representing results of analysis executed by the analysis processor 60, as shown in FIG. 20. Whenever analysis is executed by the analysis processor 60, a result of the execution is successively accumulated as the execution result information 64 (refer to "STATISTICS LOG OF ANALYSIS EXECUTION" shown in FIG. 23)

As shown in FIG. 20, the execution result information 64 represents that, as an execution result of analysis specified by No. 1, the analysis level is "UNIT ZOOM", the number of meshes configuring a purpose-specific model is "2 millions", the performance of a CPU (execution CPU) of a terminal executing the analysis is "3.2 GHz", the number of Units configuring the purpose-specific analytic model is "4", the number of PCBs configuring the purpose-specific analytic model is "20", the number of ICs configuring the purpose-specific analytic model is "0", and an execution period of the analysis is "8 hours", for example.

The analysis execution period estimator 61 estimates an analysis estimated period 65 (refer to FIG. 21) for a purpose-specific analytic model on the basis of the execution result information 64 accumulated in the execution result information accumulation section 63. For instance, before execution of analysis on a purpose-specific analytic model (including an edited analytic model generated by the edited analytic model generator 58) generated by the analytic model generator 57, the analysis execution period estimator 61 compares an analysis level, the number of meshes, execution CPU, component names and the number of the component names (hereafter referred to as analysis object components) relating to a purpose-specific analytic model (including the edited analytic model) to be analyzed with the execution result information 64 accumulated in the execution result information accumulation section 63 to estimate an estimated analysis period 65.

As a method of estimating the estimated analysis period 65 by the analysis execution period estimator 61, any one of various known method is employable. For instance, as shown in FIG. 21, when an analysis object component 66 is of an analysis level "UNIT ZOOM", the number of meshes "2 millions", the number of UNITs "4", the number of PCBs "20" and the number of ICs "0", the analysis execution period estimator 61 compares this analysis object component 66 with the execution result information 64 shown in FIG. 20, thereby estimating that the estimated analysis period 65 is "8 hours" (recommended). When another analysis object component 66 is of an analysis level "UNIT ZOOM", the number of meshes "0.5 million", the number of UNITs "4", the number of PCBs "0" and the number of ICs "0", the analysis execution period estimator 61 compares this analysis object component 66 with the execution result information 64 shown in FIG. 20, thereby estimating that the estimated analysis period 65 is "0.5 hour" (time preference). The estimated analysis period 65 estimated by the analysis execution period estimator 61 is displayed on, for example, the display section 41.

The input/output interface 44 is used to control input/output devices such as the display section 41, the input section 45, etc. The HDD 45 is a storage storing various programs and data including an OS.

The RAM 46 is used to temporarily expand and store data and programs when the CPU 43 performs various arithmetic operations. The ROM 47 stores programs and various data to be executed and processed by the CPU 43.

Figure 22:
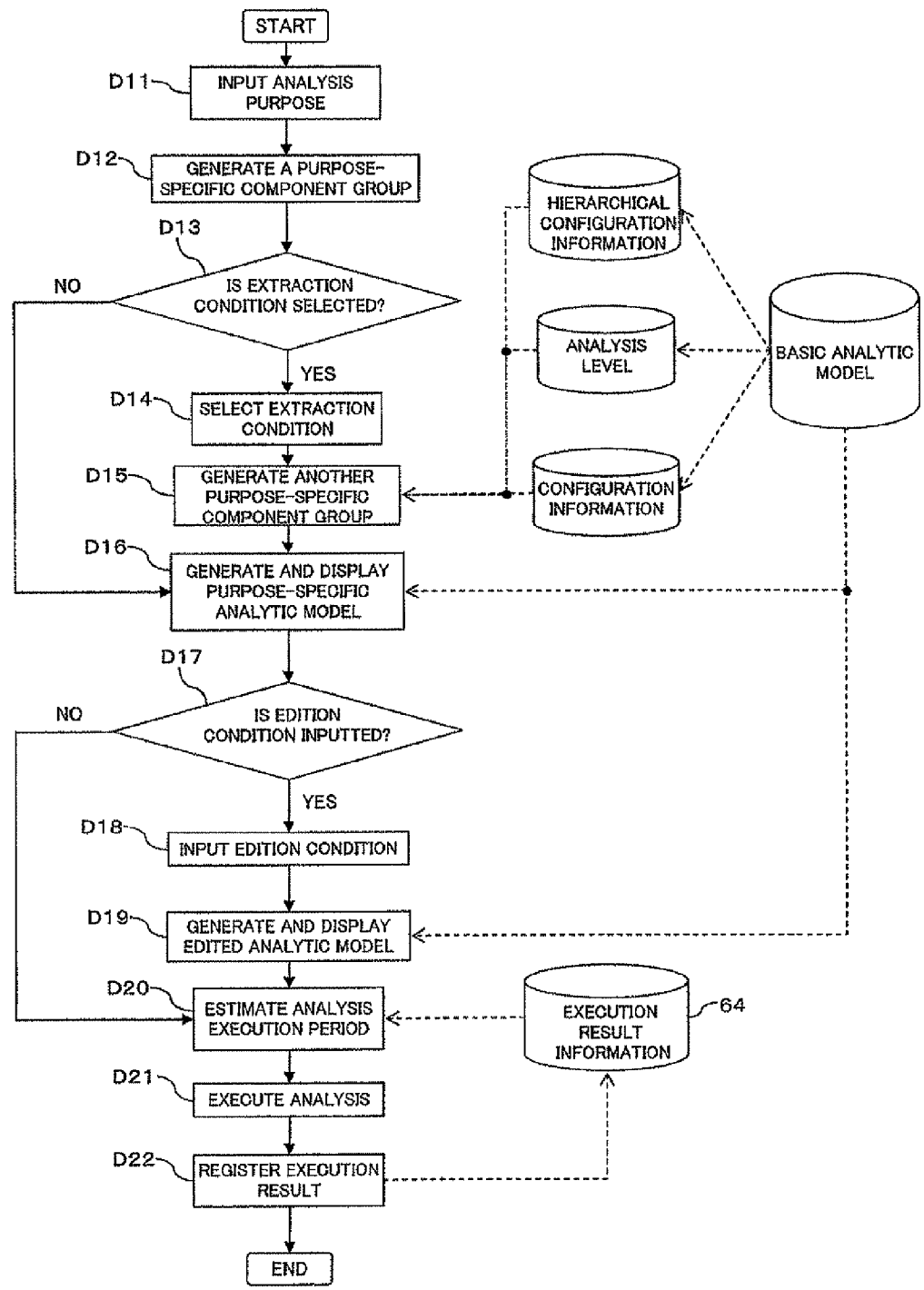
FIG. 22 is a flowchart showing a procedure of operation of the analysis support system according to the embodiment of this invention.

Now, a procedure of an operation in the analysis support system 10 configured as above according to the embodiment of this invention will be described with reference to a flow-chart (Steps D11 to D22) shown in FIG. 22.

First, the operator beforehand records a basic analytic model modeled for analysis on the basis of design data and the like of an electronic device in the basic analytic model record section 18, generates the hierarchical configuration information 29 on the basis of the basic analytic model recorded in the basic analytic model record section 18, and records the hierarchical configuration information 29 in the hierarchical configuration information record section 19 (hierarchical configuration record step). The operator associates an analysis level with each component name in the hierarchical configuration information 29 and record them in the analysis level record section 20, while associating a detail level to the analysis level and recording them in the configuration information record section 21 (configuration information record step) Further, the operator associates edition limitation information to each component name in the hierarchical configuration information 29 and records them in the edition limitation information record section 22 (edition limitation information record step). In this manner, the model configuration information 291 is generated.

The operator then inputs an analysis purpose with the use of the analysis object input section 51a (Step D11; analysis purpose input step), and designates an analysis object such as an analysis object IC, an analysis object PCB, an analysis object Unit, an analysis level or the like with the use of the component designator 51b if necessary.

When an analysis purpose is inputted with the use of the analysis purpose input section 51a, the analysis level designator 54 designates an analysis level according to the analysis purpose inputted with the use of the analysis purpose input section 51a (analysis level designation step) The purpose-specific component group generator 55 generates a purpose-specific component group from the model configuration information on the basis of the analysis level designated by the analysis level designator 54 and the detail level recorded in the configuration information record section 21 (Step D12; purpose-specific component group generation step). When the component designator 51b designates a component name, the analysis level designator 54 designates an analysis level on the basis of the analysis purpose inputted with the use of the analysis purpose input section 51a and the component name designated by the component designator 51b (analysis level designation step) The purpose-specific component group generator 55 generates a purpose-specific component group from the model configuration information 291 on the basis of the analysis level designated by the analysis level designator 54, the detail level recorded in the configuration information record section 21, the hierarchical configuration information 29 recorded in the hierarchical configuration information record section 19 and the component name designated by the component designator 51b (purpose-specific component group generation step).

It is determined whether an arbitrary component name is selected as an extraction condition from the purpose-specific component group generated by the purpose-specific component group generator 55 (Step D13).

When an extraction condition is selected (refer to "YES" route at Step D13), the component selection list generator 56 generates the analysis object selection list 41b-1, the analysis object item 41b-2, the detailing object selection list 41b-3 and the detailing object item 41b-4 on the basis of the purpose-specific component group generated by the purpose-specific component group generator 55, and displays them on the component selection screen 41b. The operator selects arbitrary component names from among component names displayed on the analysis object selection list 41b-1 and the detailing object selection list 41b-3 while referring to the component selection screen 41b with the use of the component selector 52 (Step D14; component selection step), whereby the purpose-specific component group generator 55 extracts the component name selected by the component selector 52 to generate again a purpose-specific component group (Step D15).

When the purpose-specific component group is generated by the purpose-specific component group generator 55, the analytic model generator 57 generates a purpose-specific analytic model on the basis of the basic analytic model recorded in the basic analytic model record section 18 and the purpose-specific component group generated by the purpose-specific component group generator 55, and displays the purpose-specific analytic model on the analytic model display screen 41c (Step D16; analytic model generation step).

When an extraction condition is not selected (refer to "NO" route at Step D13), the procedure proceeds to Step D16.

It is determined whether the purpose-specific analytic model generated by the analytic model generator 57 is edited or not (Step D17).

When the purpose-specific analytic model is edited (refer to "YES" route at Step D17), the operator inputs edition conditions (replace, delete, move) for components (analytic components) configuring the purpose-specific analytic model generated by the analytic model generator 57 within a range limited by the edition limitation information recorded in the edition limitation information record section 22 while referring to the analytic model display screen 41c with the use of the edition condition input section 53 (Step D18). Whereby, the edited analytic model generator 58 generates an edited analytic model according to the edition conditions inputted with the use of the edition condition input section 53 from the purpose-specific analytic model generated by the analytic model generation section 57, and displays the edited analytic model on the analytic model display screen 41c (Step D19; edition analytic model generation step). Further, the difference information generator 59 generates difference information representing a difference between the purpose-specific analytic model generated by the analytic model generator 57 and the edited analytic model generated by the edited analytic model generator 58, and displays the difference information as the difference display screens 41d-1 and 41d-2 on the display section (difference information generation step).

When the purpose-specific analytic model or the edited analytic model is generated, the analysis execution period estimator 61 estimates an estimated analysis period 65 for the purpose-specific analytic model on the basis of the execution result information 64 accumulated in the execution result information accumulation section 63 (Step D20; analysis execution period estimation step).

When the purpose-specific analytic model is not edited (refer to "NO" route at Step D17), the procedure proceeds to Step D20.

Thereafter, the analysis processor 60 executes analysis on the purpose-specific analytic model or the edited analytic model (Step D21; analysis process step), and accumulates a result of the execution as the execution result information 64 in the execution result information accumulation section 63 when execution of the analysis is completed (Step D22; execution result information accumulation step), then the process is terminated.

Now, effects provided by the analysis support system 10 according to the embodiment of the present invention will be described with reference to FIG. 23.

The analysis support system 10 according to the embodiment of this invention designates an analysis level fitting an inputted analysis purpose (refer to "PURPOSE 1, PURPOSE 2, . . . , PURPOSE N" in FIG. 23), and generates a purpose-specific component group on the basis of the designated analysis level and configuration information. Accordingly, since the purpose-specific analytic model is automatically generated from a basic analysis model (refer to "AUTOMATICALLY GENERATE AN EXTRACTED ANALYTIC MODEL FITTING THE ANALYSIS PURPOSE" in FIG. 23), even a designer or the like who does not have knowledge about thermal analysis can readily perform thermal analysis meeting each analysis purpose, and can readily manage the analytic model. Automatic generation of a purpose-specific analytic model can decrease steps of generating the purpose-specific analytic model by a person exclusively assigned to analysis, and enables a designer or the like who does not have knowledge about thermal analysis to smoothly perform a series of work of design, analysis and verification. Further, automatic generation of a purpose-specific analytic model can eliminate manual work from the generation process of the purpose-specific analytic model, which can prevent the analysis accuracy from degrading.

Generation (extraction) of a purpose-specific analytic model from a basic analytic model facilitates operations such as evaluation point setting, analysis region setting and so forth.

By defining beforehand keywords that can be inputted as analysis purposes and analysis levels corresponding to respective keywords and by registering the keywords and analysis levels, it becomes possible to designate an analysis level corresponding to an inputted keyword to automatically generate a purpose-specific component group. This can avoid occurrence of a case where an analytic model differing from the primary analysis purpose (that is, an analytic model different from one that the designer or the like intends) is made. That the designer or the like can input an analysis purpose in Japanese language can prevent occurrence of a case where an analytic model differing from one fitting the primary analysis purpose is made.

Since edition conditions for analytic component configuring a purpose-specific analytic model can be inputted within a range limited by the edition limitation information, it is possible to prevent a designer or the like who does not have knowledge about thermal analysis from performing erroneous operation such as deleting an analytic component configuring a purpose-specific analytic model in error, moving an analytic component to a position beyond supposition, for example. This is effective to avoid degradation of the analysis accuracy. Since edition limitation conditions are displayed on the display section 41, when a purpose-specific analytic model is edited, the operator can understand an intension of preparation of an analytic model. This can prevent the operator from making a mistake in edition.

Since difference information representing a difference between a purpose-specific analytic model generated by the analytic model generator 57 and an edited analytic model generated by the edited analytic model generator 58 is generated and displayed on the display section 41 (refer to "DISPLAY A DIFFERENCE IN ANALYTIC MODELS" in FIG. 23), the operator can visually understand an intension of preparation of an edited analytic model. This is helpful for the operator to evaluate a result of analysis on the edited analytic model with certainty.

Estimation of an analysis execution period for a purpose-specific analytic model (refer to "ESTIMATE AN ANALYSIS PERIOD" in FIG. 23) on the basis of execution result information (refer to "STATISTICS LOG OF ANALYSIS EXECUTION" in FIG. 23) accumulated in the execution result information accumulation section 63 can eliminate execution of unnecessary (excessive) analysis. By maintaining analytic meshes and only adding analytic meshes of an added component, it is possible to estimate convergence and an analysis period from past statistics without performing pre-analysis. Further, by estimating an analysis execution period, it is possible to find environments adaptable to a required analysis period, which is helpful to make a resource plan.

[2] Others

Note that the present invention is not limited to the above examples, but may be made without departing from the spirit and scope of the invention.

In the above embodiment, in the analysis support system 10, the first storage 11 is provided with the basic analytic model record section 18, the hierarchical configuration information record section 19, the analysis level record section 20, the configuration information record section 21 and the edition limitation information record section 22, while the second storage 14 is provided with the execution result information accumulation section 63. However, the present invention is not limited to this example. The basic analytic model record section 18, the hierarchical configuration information record section 19, the analytic level record section 20, the configuration information record section 21, the edition limitation information record section 22 and the execution result information accumulation section 63 may be provided to a storage built in the information processing apparatus 13 shown in FIG. 1 or to an external storage of the same.

In the above embodiment, the attribute information 15 including analysis level, configuration information and edition limitation information is added to each component name configuring the hierarchical configuration information 29. However, the present invention is not limited to this example. For instance, there may be a component name without the attribute information 15. In such case, a component name without the attribute information 15 can take over the attribute information 15 added to a component name higher in level than this component name.

In the above embodiment, information about components lower in level than a relevant component is shown as the detail level. However, the present invention is not limited to this example. As the detail level, information about a relevant component and components lower in level than this component may be made.

The functions as the analysis level designator 54, the purpose-specific component group generator 55, the component selection list generator 56, the analytic model generator 57, the edited analytic model generator 58, the difference information generator 59, the analysis processor 60 and the analysis execution period estimator 61 in the analysis support system 10 configured as above can be realized by a computer (including a CPU, an information processing device, and various terminals) that executes a predetermined application program (OS or analysis support program).

The program is provided in a form recorded in a computer-readable recording medium such as a flexible disc, CD (CD-ROM, CD-R, CD-RW, etc.), a DVD (DVD-ROM, DVD-RAM, DVD-R, DVD-RW, DVD+R, DVD+RW, etc.), etc. In this case, the computer reads the analysis support program from the recording medium, transfers it to an internal storage device or an external storage device, and stores it for use. Further, the program may be recorded in a storage device (a recording medium) such as a magnetic disc, an optical disc, an opto-magnetic disc or the like and provided to a computer from the storage device via a communication line.

Here, a computer is a concept including hardware and an OS (operating system) and means hardware that operates under the control of the OS. Further, when hardware is operated with an application program alone without an OS, the hardware itself corresponds to a computer, Hardware is provided with at least a microprocessor such as CPU and a means to read a program recorded in a recording medium.

An application program as the above-mentioned analysis support program includes program code for causing a computer to realize the functions as the analysis level designator 54, the purpose-specific component group generator 55, the component selection list generator 56, the analytic model generator 57, the edited analytic model generator 58, the difference information generator 59, the analysis processor 60 and the analysis execution period estimator 61 in the above-described analysis support system 10. Alternatively, part of the functions may be realized not by an application program but by an OS.

Furthermore, as the recording medium in the present embodiment, in addition to the flexible disc, CD, DVD, magnetic disc, optical disc, or opto-magnetic disc, a variety of computer-readable media such as an IC card, ROM cartridge, magnetic tape, punch card, internal storage device (memory as RAM, ROM, etc.) of a computer, an external storage device, and a printing on which code such as bar code is printed may be used.

Figure 24:
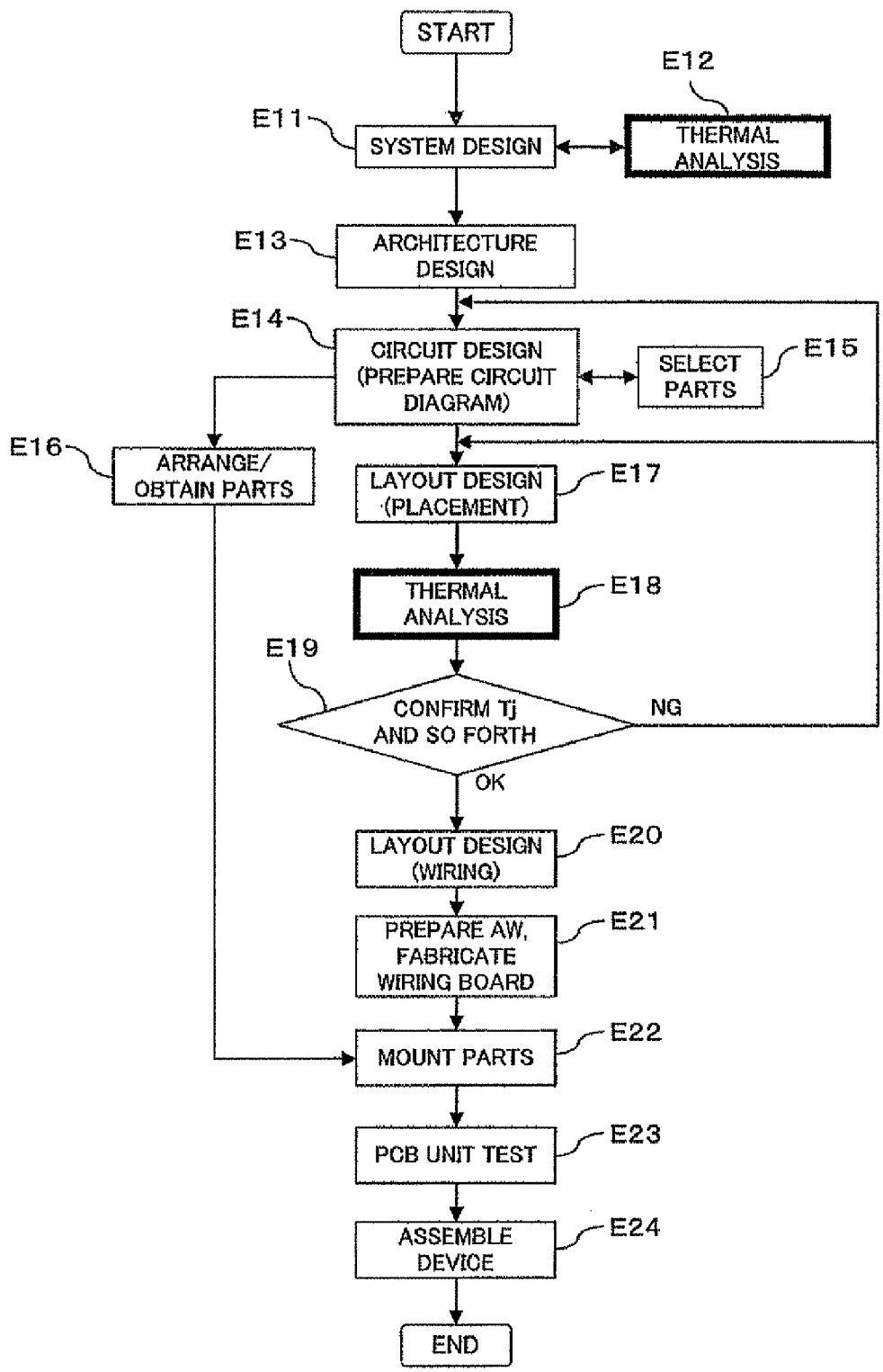
FIG. 24 is a flowchart showing an example of design process for an electronic device using the analysis support system according to the embodiment of this invention.
Figure 25:
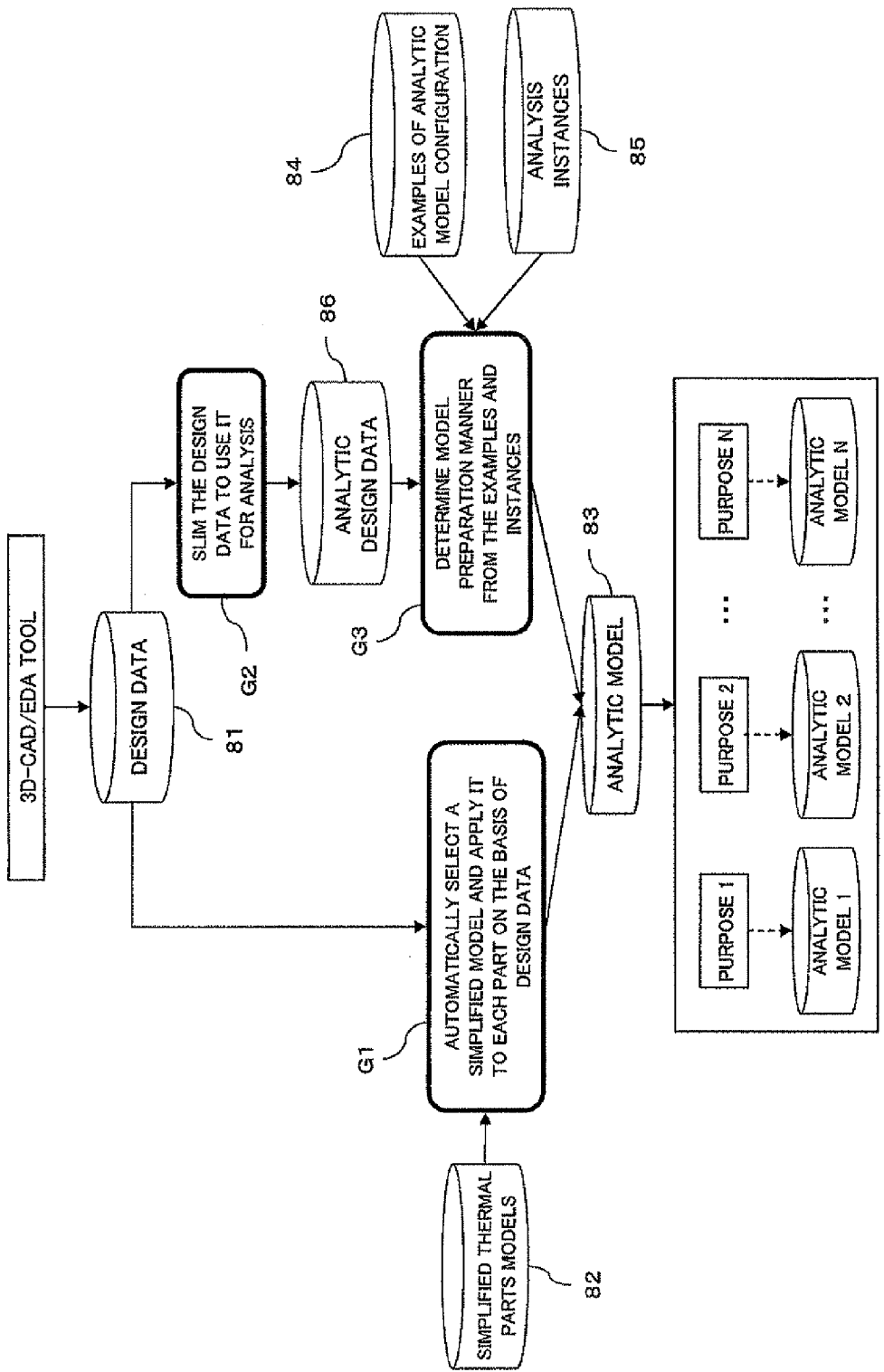
FIG. 25 is a diagram for illustrating an example of known analytic model generation technique.

Analysis with the use of the analysis support system 10 configured as above is performed in a design process for an electronic device, for example. Now, an example of the design process for an electronic device will be explained with reference to a flowchart (Steps E11 to E24) shown in FIG. 24.

First, the designer works out a system design (Step E11), upon which the designer or a person exclusively appointed for analysis performs analysis on the basis of design data prepared in the system design, thereby to prepare cooling constraints specification for circuit/layout design (Step E12).

Next, the designer makes architecture design on the basis of the cooling constraints specification prepared in the system design (Step E13), prepares a circuit diagram on the basis of the design data prepared in the architecture design (Step E14), and selects parts (components) configuring the electronic device (Step E15).

On the basis of the prepared circuit diagram, parts are arranged and obtained (Step E16), and the designer makes a layout design relating to placement of the selected parts (Step E17). At this point of time, the designer performs analysis on the basis of the design data prepared in the layout design to confirm temperature conditions of the electronic device such as junction temperatures (Tj) of the parts, etc. (Step E18).

Whereby, the designer determines whether the temperature conditions are favorable or not (Step E19).

When the designer determines that the temperature conditions are not favorable (refer to "NG" route at Step E19), the designer again prepares a circuit diagram on the basis of the design data prepared in the architecture design (Step E14), and selects parts (components) configuring the electronic device (Step E15).

When the designer determines that the temperature conditions are favorable (refer to "OK" route at Step E19), the designer makes a layout design relating to wiring on the basis of the prepared circuit diagram (Step E20).

When the layout design is completed, AW (Art Work) is prepared and a wiring board is fabricated in a process that follows the designing (Step E21), and the parts obtained at Step E16 are mounted (Step E22).

PCB unit test is made (Step E23), the electronic device is assembled (Step E24), and the process is terminated.

A CAD (Computer Aided Design) system used for the system design and the layout design in the design process of the above electronic device may function as the analysis support system 10 configured as above.

The above embodiment has been described in the case where the present invention is applied to thermal analysis. However, the present invention is not limited to this example, but may be used for other analysis of a shape-non-dependent type not dependent on a component shape such as fluid analysis or the like, for example.

The present invention is applicable to various analyses of a shape-non-dependent type not dependent on a component shape such as fluid analysis and the like other than thermal analysis.

What is claimed is:

1. An analysis support system generating a purpose-specific analytic model used to analyze an analysis object comprised of a plurality of components according to an analysis purpose, the purpose-specific analytic model having an analytic component generated on the basis of said components, the analysis support system comprising:
    an analysis purpose input section being able to input the analysis purpose;
    an analysis level designator designating at least one analysis level, representing a range for analysis, according to the analysis purpose inputted from the analysis purpose input section;
    a configuration information record section recording configuration information about at least one other component to be combined with each of said components, the configuration information being associated with the at least one analysis level;
    a purpose-specific component group generator generating a purpose-specific component group representing the analytic component that is to configure the purpose-specific analytic model, on the basis of the at least one analysis level designated by the analysis level designator and the configuration information recorded in the configuration information record section; and
    an analytic model generator generating the purpose-specific analytic model on the basis of a basic analytic model having the analytic component corresponding to the analysis object and the purpose-specific component group generated by the purpose-specific component group generator.

2. The analysis support system according to claim 1, wherein the analysis object is in a hierarchical configuration that is a combination of a plurality of said at least one analysis level;
    the configuration information is information about said at least one other component lower in analysis level than each of said components;
    the analysis support system further comprises a hierarchical configuration information record section recording hierarchical configuration information hierarchically representing information about said components configuring the analysis object, the hierarchical configuration information being associated with the configuration information; and
    the purpose-specific component group generator generates the purpose-specific component group on the basis of the analysis level designated by the analysis level designator, the configuration information recorded in the configuration information record section and the hierarchical configuration information recorded in the hierarchical configuration information record section.

3. The analysis support system according to claim 1 further comprising a component selector being able to select the analytic component configuring the purpose-specific analytic model;
    wherein the purpose-specific component group generator generates the purpose-specific component group on the basis of the configuration information relating to the analytic component selected by the component selector, the analysis level designated by the analysis level designator and the configuration information recorded in the configuration information record section.

4. The analysis support system according to claim 1 further comprising:
    an edition limitation information record section recording edition limitation information for limiting edition of each of said components of said analysis object;
    an edition condition input section being able to input an edition condition for the analytic component configuring the purpose-specific analytic model generated by the analytic model generator, within a range limited by the edition limitation information recorded in the edition limitation information record section; and
    an edited analytic model generator generating, from the purpose-specific analytic model generated by the analytic model generator, an edited analytic model according to the edition condition inputted from the edition condition input section.

5. The analysis support system according to claim 4, wherein the edition condition input section is able to input replacement of the analytic component configuring the purpose-specific analytic model with a replacement candidate component in the basic analytic model, deletion of the analytic component configuring the purpose-specific analytic model or movement of the analytic component configuring the purpose-specific analytic model, as the edition condition.

6. The analysis support system according to claim 4 still further comprising:
    a difference information generator generating difference information representing a difference between the purpose-specific analytic model generated by the analytic model generator and the edited analytic model generated by the edited analytic model generator.

7. The analysis support system according to claim 1 further comprising:
    an analysis processor executing analysis of the purpose-specific analytic model generated by the analytic model generator;
    an execution result information accumulation section accumulating execution result information representing a result of execution of the analysis by the analysis processor; and
    an analysis execution period estimator estimating an analysis execution period of the purpose-specific analytic model on the basis of the execution result information accumulated in the execution result information accumulation section.

8. An analysis support method generating a purpose-specific analytic model used to analyze an analysis object comprised of a plurality of components according to an analysis purpose, the purpose-specific analytic model having an analytic component generated on the basis of said components, the analysis support method comprising:
    inputting the analysis purpose;
    designing at least one analysis level, representing a range for analysis, according to the analysis purpose;
    recording configuration information about at least one other component to be combined with each of said components in a configuration information record section, the configuration information being associated with the analysis level;

(iv) generating a purpose-specific component group representing the analytic component that is to configure the purpose-specific analytic model, on the basis of the at least one analysis level and the configuration information recorded in the configuration information record section; and generating the purpose-specific analytic model on the basis of a basic analytic model having the analytic component corresponding to the analysis object and the purpose-specific component group.

9. The analysis support method according to claim 8, wherein the analysis object is in a hierarchical configuration that is a combination of a plurality of said at least one analysis level;

the configuration information is information about said at least one other component lower in analysis level than each of said components;

the analysis support method further comprises recording hierarchical configuration information hierarchically representing information about said components configuring the analysis object in a hierarchical configuration information record section, the hierarchical configuration information being associated with the configuration information; and upon the generating the purpose-specific component group, the purpose-specific component group is generated on the basis of the at least one analysis level, the configuration information recorded in the configuration information record section and the hierarchical configuration information recorded in the hierarchical configuration information record section.

10. The analysis support method according to claim 8 further comprising: selecting the analytic component configuring the purpose-specific analytic model;

wherein upon the generating the purpose-specific component group, the purpose-specific component group is generated on the basis of the configuration information relating to the selected analytic component, the at least one analysis level and the configuration information recorded in the configuration information record section.

11. The analysis support method according to claim 8 further comprising:

recording edition limitation information limiting edition of each of said components of said analysis object in an edition limitation information record section;

inputting an edition condition for the analytic component configuring the purpose-specific analytic model within a range limited by the edition limitation information recorded in the edition limitation information record section; and generating an edited analytic model according to the edition condition from the purpose-specific analytic model.

12. The analysis support method according to claim 8 further comprising:

executing analysis of the purpose-specific analytic model;

accumulating execution result information representing a result of the execution of the analysis in an execution result information accumulation section; and estimating an analysis execution period of the purpose-specific analytic model on the basis of the execution result information accumulated in the execution result information accumulation section.

13. A computer readable recording medium storing an analysis support program for causing a computer to execute an analysis support function of generating a purpose-specific analytic model used to analyze an analysis object comprised of a plurality of components according to an analysis purpose, the purpose-specific analytic model having an analytic component generated on the basis of said components, the analysis support program causing the computer function as:

an analysis purpose input section being able to input the analysis purpose;

an analysis level designator designating at least one analysis level, representing a range for analysis, according to the analysis purpose;

a purpose-specific component group generator generating a purpose-specific component group representing the analytic component that is to configure the purpose-specific analytic model, on the basis of the analysis level designated by the analysis level designator and model configuration information made by associating configuration information about at least one other component to be combined with each of said components with the analysis level; and an analytic model generator generating the purpose-specific analytic model on the basis of a basic analytic model having the analytic component corresponding to the analysis object and the purpose-specific component group generated by the purpose-specific component group generator.

14. The computer readable recording medium storing an analysis support program according to claim 13, wherein the analysis object is in a hierarchical configuration that is a combination of a plurality of said at least one analysis level;

the configuration information is information about said at least one other component lower in analysis level than each of said components; and the purpose-specific component group generator generates the purpose-specific component group on the basis of the analysis level designated by the analysis level designator, model hierarchy information made by associating hierarchical configuration information representing the hierarchical configuration of the analysis object with the configuration information and the hierarchical configuration information recorded in a hierarchical configuration information record section.

15. The computer readable recording medium storing an analysis support program according to claim 13, wherein the analysis support program further causes the computer to function as a component selector being able to select the analytic component configuring the purpose-specific analytic model;

the purpose-specific component group generator generates the purpose-specific component group on the basis of the configuration information relating to the analytic component selected by the component selector, the analysis level designated by the analysis level designator and the configuration information recorded in a configuration information record section.

16. The computer readable recording medium storing an analysis support program according to claim 13, wherein the analysis support program further causes the computer to function as:

an edition condition input section being able to input an edition condition for the analytic component configuring the purpose-specific analytic model generated by the analytic model generator, within a range limited by the edition limitation information for limiting edition of each of said components of said analysis object; and an edited analytic model generator generating, from the purpose-specific analytic model generated by the analytic model generator, an edited analytic model according to the edition condition inputted from the edition condition input section.

17. The computer readable recording medium storing an analysis support program according to claim 13, wherein the analysis support program further causes the computer to function as:
- an analysis processor executing analysis of the purpose-specific analytic model generated by the analytic model generator; and
- an analysis execution period estimator estimating an analysis execution period of the purpose-specific analytic model on the basis of execution result information representing a result of execution of analysis by the analysis processor.

18. An analysis support apparatus generating a purpose-specific analytic model used to analyze an analysis object comprised of a plurality of components according to an analysis purpose, the purpose-specific analytic model having an analytic component generated on the basis of said components, the analysis support apparatus comprising:
- an analysis purpose input section being able to input the analysis purpose;
- an analysis level designator designating at least one analysis level, representing a range for analysis, according to the analysis purpose inputted from the analysis purpose input section;
- a purpose-specific component group generator generating a purpose-specific component group representing the analytic component that is to configure the purpose-specific analytic model, on the basis of the analysis level designated by the analysis level designator and model configuration information made by associating configuration information about at least one other component to be combined with each of said components with the analysis level; and
- an analytic model generator generating the purpose-specific analytic model on the basis of a basic analytic model having the analytic component corresponding to the analysis object and the purpose-specific component group generated by the purpose-specific component group generator.

19. The analysis support apparatus according to claim 18, wherein the analysis object is in a hierarchical configuration that is a combination of a plurality of said at least one analysis level;
- the configuration information is information about said at least one other component lower in analysis level than each of said components; and
- the purpose-specific component group generator generates the purpose-specific component group on the basis of the analysis level designated by the analysis level designator, model hierarchy information made by associating hierarchical configuration information representing the hierarchical configuration of the analysis object with the configuration information and the hierarchical configuration information.

20. The analysis support apparatus according to claim 18 further comprising:
- an analysis processor executing analysis of the purpose-specific analytic model generated by the analytic model generator; and
- an analysis execution period estimator estimating an analysis execution period of the purpose-specific analytic model on the basis of execution result information representing a result of execution of analysis by the analysis processor.

* * * * *